US012770434B2

(12) United States Patent
Ogino et al.

(10) Patent No.: US 12,770,434 B2
(45) Date of Patent: Oct. 20, 2026

(54) INFORMATION PROCESSING SYSTEM, INFORMATION PROCESSING METHOD, AND RECORDING MEDIUM

(71) Applicant: NEC Corporation, Tokyo (JP)

(72) Inventors: Yuka Ogino, Tokyo (JP); Takahiro Toizumi, Tokyo (JP); Ryuichi Akashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 238 days.

(21) Appl. No.: 18/710,664

(22) PCT Filed: Mar. 2, 2022

(86) PCT No.: PCT/JP2022/008942
§ 371 (c)(1),
(2) Date: May 16, 2024

(87) PCT Pub. No.: WO2023/166629
PCT Pub. Date: Sep. 7, 2023

(65) Prior Publication Data

US 2025/0014387 A1 Jan. 9, 2025

(51) Int. Cl.
*G06V 40/18* (2022.01)
*G06T 7/70* (2017.01)
*G06V 40/19* (2022.01)

(52) U.S. Cl.
CPC .............. *G06V 40/197* (2022.01); *G06T 7/70* (2017.01); *G06V 40/19* (2022.01); *G06V 2201/07* (2022.01)

(58) Field of Classification Search
CPC .. G06V 40/197; G06V 40/19; G06V 2201/07; G06V 10/16; G06T 7/70; G06T 7/00
See application file for complete search history.

(56) References Cited

U.S. PATENT DOCUMENTS

2005/0084179 A1 4/2005 Hanna et al.
2009/0278658 A1 11/2009 Higashiyama
(Continued)

FOREIGN PATENT DOCUMENTS

JP H07-298308 A 11/1995
JP H08-210847 A 8/1996
(Continued)

OTHER PUBLICATIONS

International Search Report for PCT Application No. PCT/JP2022/008942, mailed on May 24, 2022.
(Continued)

*Primary Examiner* — Tom Y Lu

(57) ABSTRACT

An information processing system includes: an acquisition unit that acquires a first image and a second image that are captured such that optical axes intersect at a predetermined point; a determination unit that determines whether or not a difference between a position of a target in the first image and a position of the target in the second image is in a predetermined range; and a control unit that performs a control of capturing an iris image of the target in a case where the difference is in the predetermined range. According to such an information processing system, the iris image of the target can be captured at appropriate timing.

14 Claims, 24 Drawing Sheets

(56) References Cited

U.S. PATENT DOCUMENTS

| | | | | |
|---|---|---|---|---|
| 2010/0225744 | A1 | 9/2010 | Tomizawa et al. | |
| 2015/0287206 | A1 | 10/2015 | Ebisawa | |
| 2017/0228594 | A1 | 8/2017 | Takemoto | |
| 2018/0295346 | A1 | 10/2018 | Rouh et al. | |
| 2019/0065722 | A1* | 2/2019 | Kaehler | G06V 40/193 |
| 2020/0044014 | A1* | 2/2020 | Murukesan | H10D 84/0151 |
| 2020/0050877 | A1* | 2/2020 | Li | G06V 40/70 |
| 2020/0334795 | A1* | 10/2020 | Wu | B60K 35/235 |

FOREIGN PATENT DOCUMENTS

| | | | |
|---|---|---|---|
| JP | 2004-038531 | A | 2/2004 |
| JP | 2004-046451 | A | 2/2004 |
| JP | 2005-065813 | A | 3/2005 |
| JP | 2006-338236 | A | 12/2006 |
| JP | 2007-213369 | A | 8/2007 |
| JP | 2008-310480 | A | 12/2008 |
| JP | 2010-212881 | A | 9/2010 |
| JP | 2017-062756 | A | 3/2017 |
| JP | 2017-142772 | A | 8/2017 |
| WO | 2009/016846 | A1 | 2/2009 |

OTHER PUBLICATIONS

Extended European Search Report for EP Application No. 22929774.2, dated on Feb. 19, 2025.

* cited by examiner (a) FAR FROM TRIGGER POINT (b) TRIGGER POINT

INFORMATION PROCESSING SYSTEM, INFORMATION PROCESSING METHOD, AND RECORDING MEDIUM

This application is a National Stage Entry of PCT/JP2022/008942 filed on Mar. 2, 2022, the contents of all of which are incorporated herein by reference, in their entirety.

TECHNICAL FIELD

This disclosure relates to technical fields of an information processing system, an information processing method, and a recording medium.

BACKGROUND ART

A known system of this type detects a position of a subject and starts to capture an iris image. For example, Patent Literature 1 discloses a technique/technology of detecting that a subject enters in a predetermined distance range by using a ranging sensor, and of starting imaging in a case where the subject enters in the predetermined distance range.

As another related art, Patent Literature 2 discloses that a three-dimensional image is acquired on the basis of images captured from a plurality of differing viewpoints. Patent Literature 3 discloses that an image is captured when a corneal apex of a subject eye coincides with an intersection of optical axes between an illumination optical system and an imaging optical system. Patent Literature 4 discloses that a target located at an intersection of optical axes between a camera A and a camera B is displayed on a screen.

CITATION LIST

Patent Literature

Patent Literature 1: JP2006-338236A
Patent Literature 2: JP2010-212881A
Patent Literature 3: JP2005-065813A
Patent Literature 4: JPH07-298308A

SUMMARY

Technical Problem

This disclosure aims to improve the techniques/technologies disclosed in Citation List.

Solution to Problem

An information processing system according to an example aspect of this disclosure includes: an acquisition unit that acquires a first image and a second image that are captured such that optical axes intersect at a predetermined point; a determination unit that determines whether or not a difference between a position of a target in the first image and a position of the target in the second image is in a predetermined range; and a control unit that performs a control of capturing an iris image of the target in a case where the difference is in the predetermined range.

An information processing method according to an example aspect of this disclosure is an information processing method executed by at least one computer, the information processing method including: acquiring a first image and a second image that are captured such that optical axes intersect at a predetermined point; determining whether or not a difference between a position of a target in the first image and a position of the target in the second image is in a predetermined range; and performing a control of capturing an iris image of the target in a case where the difference is in the predetermined range.

A recording medium according to an example aspect of this disclosure is a recording medium on which a computer program that allows at least one computer to execute an information processing method is recorded, the information processing method including: acquiring a first image and a second image that are captured such that optical axes intersect at a predetermined point; determining whether or not a difference between a position of a target in the first image and a position of the target in the second image is in a predetermined range; and performing a control of capturing an iris image of the target in a case where the difference is in the predetermined range.

DESCRIPTION OF EXAMPLE EMBODIMENTS

Hereinafter, an information processing system, an information processing method, and a recording medium according to example embodiments will be described with reference to the drawings.

First Example Embodiment

An information processing system according to a first example embodiment will be described with reference to FIGS. 1 to 5.

(Hardware Configuration)

Figure 1:
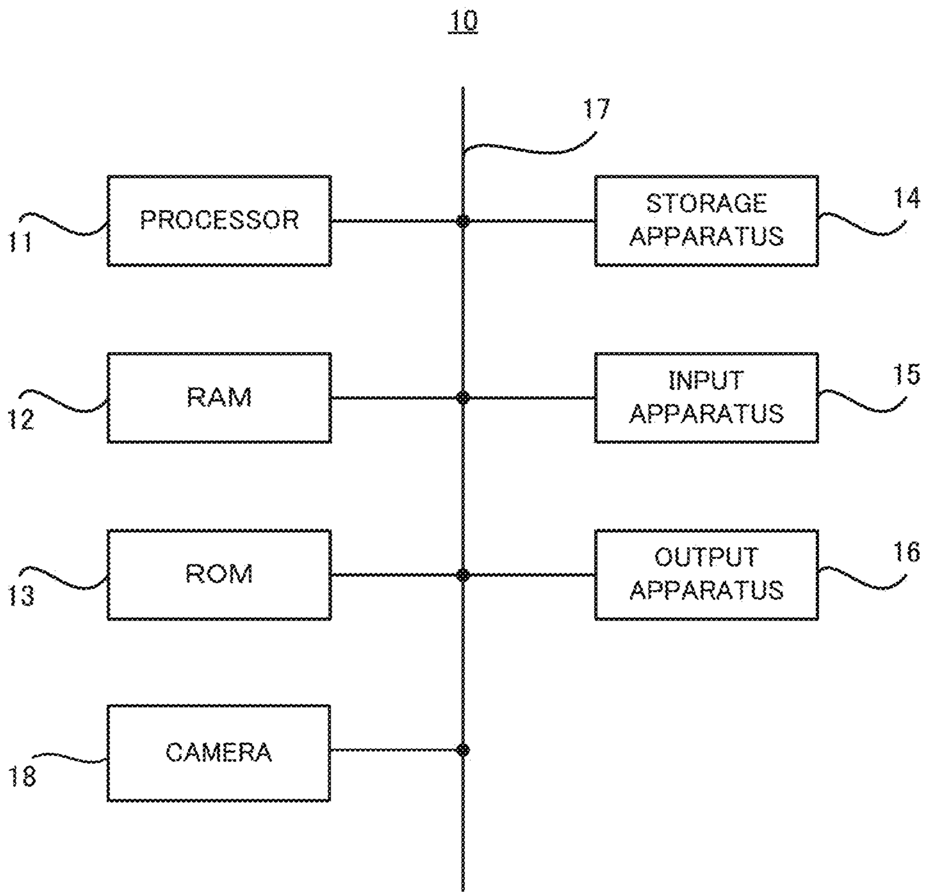
FIG. 1 is a block diagram illustrating a hardware configuration of ab information processing system according to a first example embodiment.

First, a hardware configuration of the information processing system according to the first example embodiment will be described with reference to FIG. 1. FIG. 1 is a block diagram illustrating the hardware configuration of the information processing system according to the first example embodiment.

As illustrated in FIG. 1, the information processing system 10 according to the first example embodiment includes a processor 11, a RAM (Random Access Memory) 12, a ROM (Read Only Memory) 13, and a storage apparatus 14. The information processing system 10 may further include an input apparatus 15 and an output apparatus 16. Furthermore, the information processing system 10 includes a camera 18.

The processor 11, the RAM 12, the ROM 13, the storage apparatus 14, the input apparatus 15, the output apparatus 16, and the camera 18 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the information processing system 10, through a network 10 interface. The processor 11 controls the RAM 12, the storage apparatus 14, the input apparatus 15, and the output apparatus 16 by executing the read computer program. Especially in the present example embodiment, when the processor 11 executes the read computer program, a functional block for performing a processing for capturing an image of a target, is realized or implemented in the processor 11. That is, the processor 11 may function as a controller for executing each control of the information processing system 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores the data that are temporarily used by the processor 11 when the processor 11 executes the computer program. The RAM12 may be, for example, a D-RAM (Dynamic Random Access Memory) or a SRAM (Static Random Access Memory). Furthermore, another type of volatile memory may also be used instead of the RAM12.

The ROM 13 stores the computer program to be executed by the processor 11. The ROM 13 may otherwise store fixed data. The ROM13 may be, for example, a P-ROM (Programmable Read Only Memory) or an EPROM (Erasable Read Only Memory). Furthermore, another type of non-volatile memory may also be used instead of the ROM13.

The storage apparatus 14 stores the data that are stored for a long term by the information processing system 10. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing system 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows voice input/audio input, including a microphone, for example.

The output apparatus 16 is an apparatus that outputs information about the information processing system 10 to the outside. For example, the output apparatus 16 may be a display apparatus (e.g., a display) that is configured to display the information about the information processing system 10. The output apparatus 16 may be a speaker device or the like that is configured to audio-output the information about the information processing system 10. The output apparatus 16 may be configured as a portable terminal such as a smartphone and a tablet. The output apparatus 16 may be an apparatus that outputs information in a form other than an image. For example, the output apparatus 16 may be a speaker that audio-outputs the information about the information processing system 10.

The camera 18 is a camera disposed at a point where an image of a target can be captured. The target here is not limited to a human being, but may include an animal such as a dog and a cat, a snake, a bird, a robot, and the like. The camera 18 may capture an image of all of the target, or may image a part of the target. The camera 18 may be a camera that captures a still image, or a camera that images a video. The camera 18 may be configured as a visible light camera, or as a near infrared camera. There may be provided a plurality of cameras 18. The plurality of cameras 18 may be of the same type, or of different types. For example, when not capturing an image, the camera 18 may be equipped with a function that automatically turns off power. In this case, for example, a camera with a short life, such as a liquid lens and a motor, may be preferentially turned off. A specific configuration of the camera 18 will be described in detail in another example embodiment later.

Although FIG. 1 illustrates an example of the information processing system 10 including a plurality of apparatuses, all or a part of the functions thereof may be realized by a single apparatus (imaging apparatus). The imaging apparatus may include only the processor 11, the RAM12, the ROM13, and the imaging unit 18, for example, and an external apparatus connected to the imaging apparatus may include the other components (i.e., the storage apparatus 14, the input apparatus 15, and the output apparatus 16), for example. In the imaging apparatus, a part of an arithmetic function may also be realized by an external apparatus (e.g., an external server or cloud, etc.).

(Functional Configuration)

Figure 2:
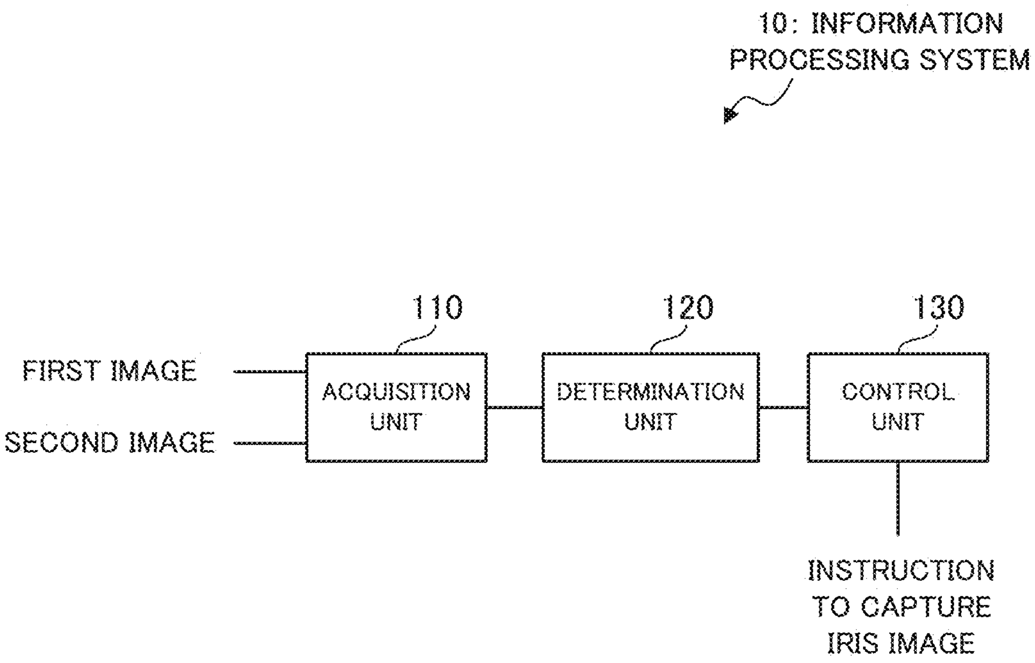
FIG. 2 is a block diagram illustrating a functional configuration of the information processing system according to the first example embodiment.

Next, a functional configuration of the information processing system 10 according to the first example embodiment will be described with reference to FIG. 2. FIG. 2 is a block diagram illustrating the functional configuration of the information processing system according to the first example embodiment.

The information processing system 10 according to the first example embodiment is configured as an image system that captures an image of a target. More specifically, the information processing system 10 is configured to capture an iris image of the target. The use of the iris image captured by the information processing system 10 is not particularly limited, but it may be used for biometric authentication, for example. For example, the information processing system 10 may be configured as a part of a system that images a walking target and performs biometric authentication (a so-called walk-through authentication system).

As illustrated in FIG. 2, the information processing system 10 according to the first example embodiment includes, as components for realizing the functions thereof, an acquisition unit 110, a determination unit 120, and a control unit 130. Each of the acquisition unit 110, the determination unit 120, and the control unit 130 may be a processing block realized or implemented by the processor 11 (see FIG. 1), for example.

The acquisition unit 110 is configured to acquire a first image and a second image. The first image and the second image are images captured such that optical axes of optical systems that capture the respective images intersect each other at a predetermined point. The first image and the second image may be captured by the camera 18 (see FIG. 1). For example, the first image and the second image may be captured by two cameras 18 whose optical axes intersect with each other. Alternatively, the first image and the second image may be captured by one camera 18 through a mirror or the like. A specific arrangement example of the cameras 18 that capture the first image and the second image will be described in detail later.

The determination unit 120 is configured to perform a determination processing using the first image and the second image acquired by the acquisition unit 110. Specifically, the determination unit 120 is configured to determine whether or not a difference between a position of the target in the first image and a position of the target in the second image is in a predetermined range. The "difference" here may be, for example, a distance (i.e., Euclidean distance) between first coordinates indicating the position of the target in the first image and second coordinates indicating the position of the target in the second image, or may be a degree of overlap between a first detection area indicating the position of the target in the first image and a second detection area indicating the position of the target in the second image (e.g., (first detection area n second detection area)/(first detection area U second detection area). Therefore, the determination unit 120 may determine whether or not the distance between the first coordinates indicating the position of the target in the first image and the second coordinates indicating the position of the target in the second image is in a predetermined range, for example. Alternatively, the determination unit 120 may determine whether or not the degree of overlap between the first detection area in the first image and the second detection area in the second image is in a predetermined range. The "predetermined range" here is a threshold set to determine that there is no large difference between the position of the target in the first image and the position of the target in the second image (in other words, the difference is in a threshold set in advance), and an appropriate value may be set in advance. The predetermined range may be set by a human, or a value may be optimized by iterative learning. The determination unit 120 may perform a processing of normalizing the first image and the second image (i.e., of matching a scale) when the difference is calculated. For example, the determination unit 120 may acquire a scale ratio of the first image and the second image in advance, and may perform the normalization processing on the basis of the scale ratio. Alternatively, the determination unit 120 may perform the processing of normalizing the first image and the second image, by using inner parameters (e.g., a focus, pixel size information, etc.) of the camera 18 that captures the first image and the second image.

The control unit 130 is configured to control the capture of the iris image of the target, on the basis of a result of the determination by the determination unit 120. Specifically, the control unit 130 may control the camera 18 to capture the iris image of the target in a case where the difference between the position of the target in the first image and the position of the target in the second image is determined to be in the predetermined range. The camera 18 (i.e., the camera 18 that captures the iris image) controlled here may be different from the camera 18 that captures the first image and the second image.

(Trigger Determination)

Figure 3:
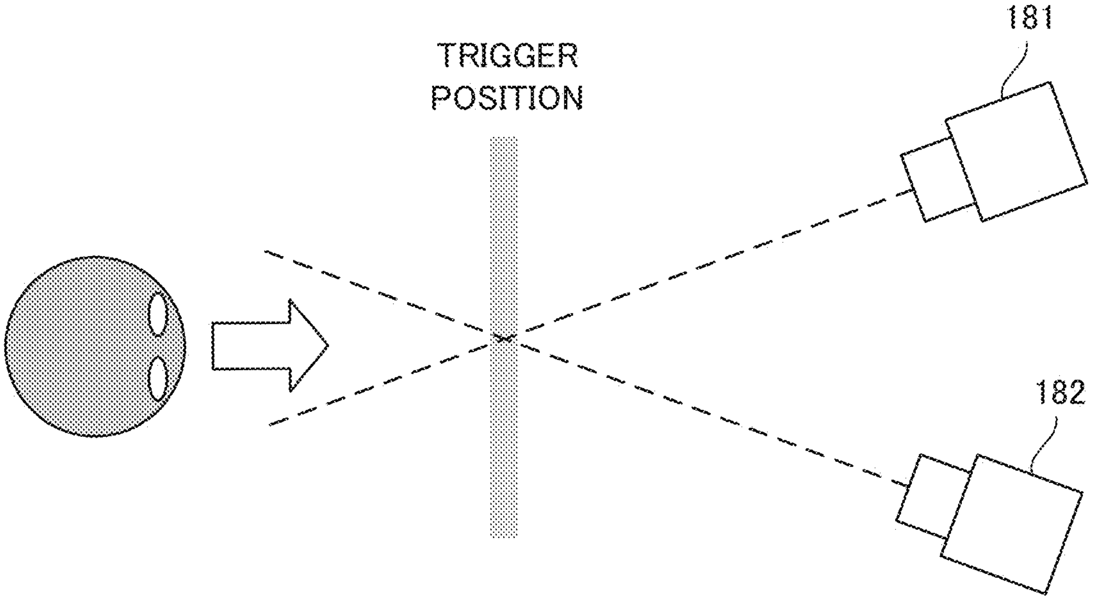
FIG. 3 is a top view illustrating optical axes of cameras in the information processing system according to the first example embodiment.
Figure 4:
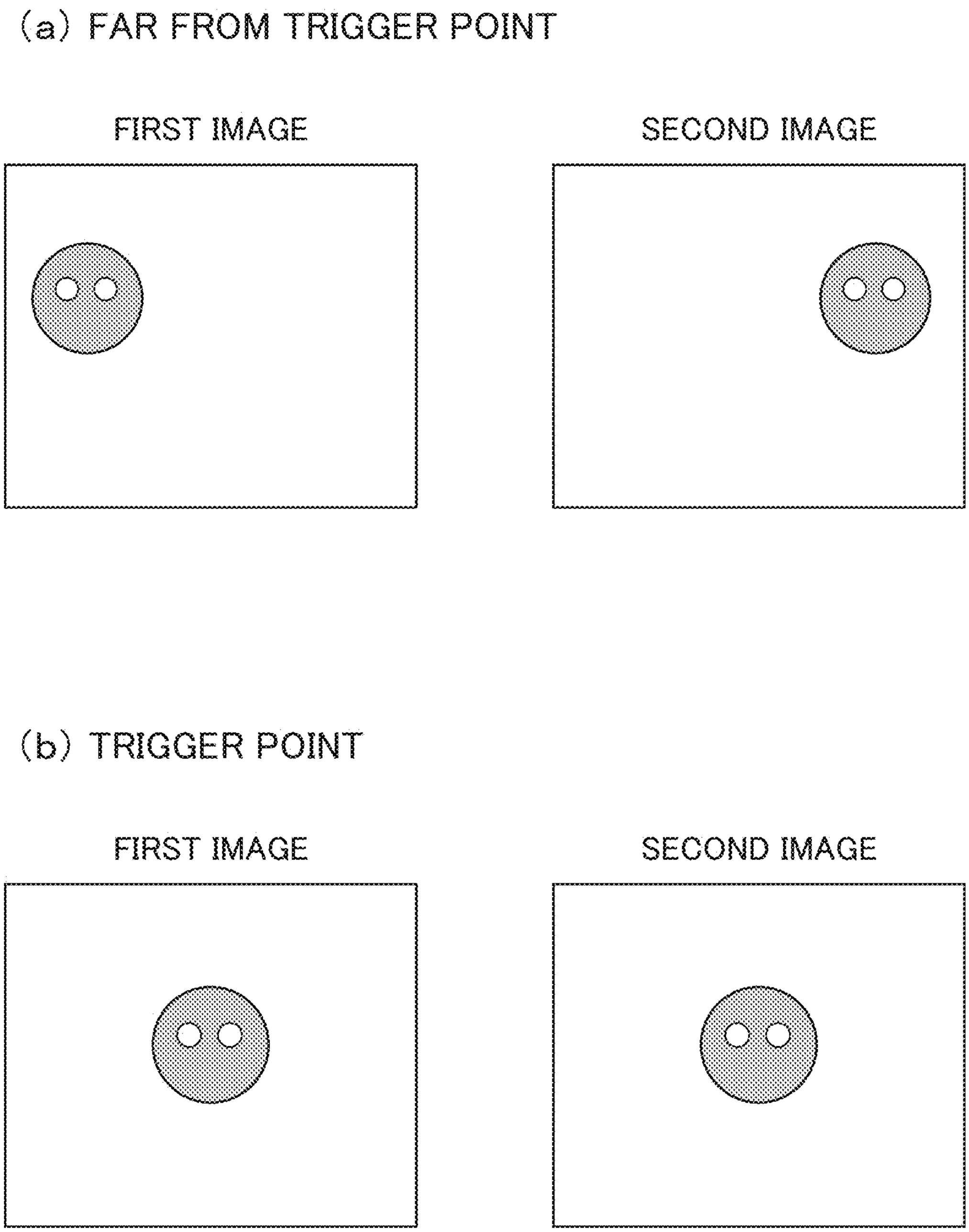
FIG. 4 is a plan view illustrating an example of a first image and a second image acquired by the information processing system according to the first example embodiment.

Next, with reference to FIG. 3 and FIG. 4, a determination processing (hereinafter referred to as a "trigger determination" as appropriate) using the first image and the second image by the determination unit 120 described above will be specifically described. FIG. 3 is a top view illustrating optical axes of cameras in the information processing system according to the first example embodiment. FIG. 4 is a plan view illustrating an example of the first image and the second image acquired by the information processing system according to the first example embodiment.

In FIG. 3, it is assumed that a first camera 181 is configured to capture the first image, and that a second camera 182 is configured to capture the second image. In this case, the first camera 181 and the second camera 182 are arranged such that the optical axes thereof intersect each other at a predetermined point. In the following, the predetermined point where the optical axes intersect each other, will be referred to as a "trigger point" as appropriate.

As illustrated in FIG. 4(*a*), in a case where the target is far from the trigger point when viewed from the first camera 181 and the second camera 182, there is a relatively large difference between the position of the target in the first image and the position of the target in the second image. For example, the target appears near a left edge of the first image, whereas the target appears near a right edge of the second image. As described above, in a case where the difference between the position of the target in the first image and the position of the target in the second image is large (i.e., not in the predetermined range), it can be determined that the target is at a position away from the trigger point.

On the other hand, as illustrated in FIG. 4(*b*), in a case where the target is at the trigger point, the difference between the position of the target at the first image and the position of the target at the second image is relatively small. For example, in both the first image and the second image, the target appears near the center of the image. As described above, in a case where the difference between the position of the target in the first image and the position of the target in the second image is small (i.e., in the predetermined range), it can be determined that the target is at the trigger point. Therefore, for example, if the trigger point is set to be near a focusing position of the camera(s) 18 that captures the iris image, it is possible to capture the iris image of the target at appropriate timing.

(Flow of Operation)

Figure 5:
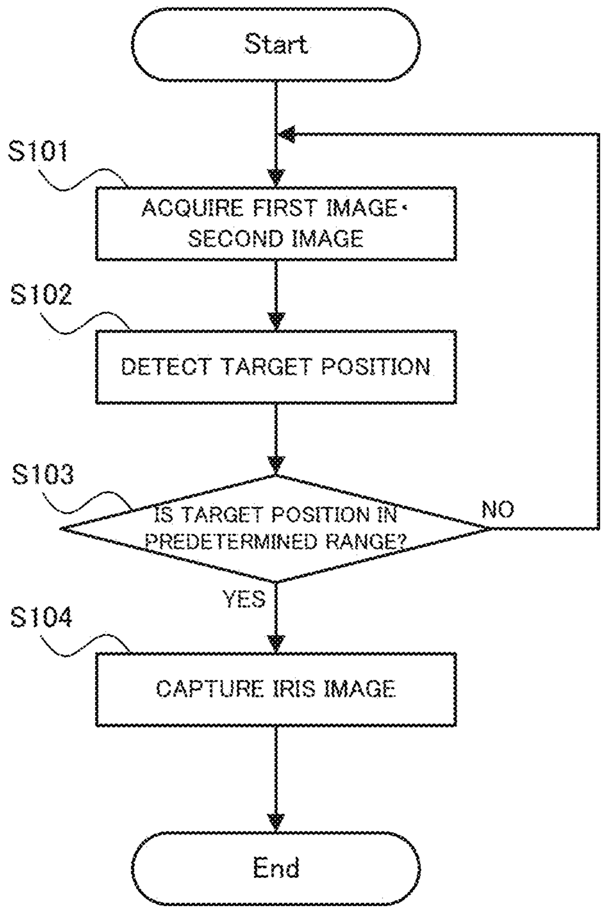
FIG. 5 is a flowchart illustrating a flow of operation of the information processing system according to the first example embodiment.

Next, a flow of operation of the information processing system 10 according to the first example embodiment will be described with reference to FIG. 5. FIG. 5 is a flowchart illustrating the flow of the operation of the information processing system according to the first example embodiment.

As illustrated in FIG. 5, when the operation of the information processing system 10 according to the first example embodiment is started, first, the acquisition unit 110 acquires the first image and the second image (step S101). It is preferable that the first image and the second image are typically images that are captured at the same time, but a slight error may be allowed. Alternatively, in a case where a difference in the imaging timing of the first image and the second image is known, the predetermined range may be set in view of the difference. The first image and the second image acquired in the acquisition unit 110 are outputted to the determination unit 120.

Subsequently, the determination unit 120 detects the position of the target from each of the first image and the second image acquired by the acquisition unit 110 (step S102). The position of the target may be detected as a position of a part set in advance, for example. For example, the determination unit 120 may detect, as the position of the target, the positions of eyes, a nose, a mouth, an entire face, a hand, a foot, or the like. In a case where the position of the eyes of the target is detected as the position of the target as an example, the determination unit 120 may detect each of a right eye position in the first image and a right eye position in the second image, or may detect each of a left eye position in the first image and a left eye position in the second image. Alternatively, the determination unit 120 may detect each of center coordinates of the right eye in the first image and center coordinates of the right eye in the second image, or may detect each of center coordinates of the left eye in the first image and center coordinates of the left eye in the second image. Alternatively, the determination unit 120 may detect each of center coordinates (a center point) of the right eye and the left eye in the first image, and center coordinates of the right eye and the left eye in the second image. The above is an example of detecting the eyes, but even in a case where another part is detected, the position of the target may be similarly detected on the basis of various points. In a case where the position of the nose of the target is detected as the position of the target as an example, the determination unit 120 may detect each of a nose position in the first image and a nose position in the second image. Alternatively, the determination unit 120 may detect each of center coordinates of the nose in the first image (e.g., center coordinates of an upper end and a lower end of the nose, or center coordinates of a right end and a left end of the nose), and center coordinates of the nose in the second image. In a case where the position of the face of the target is detected as the position of the target as an example, the determination unit 120 may detect each of the position of the entire face in the first image and the position of the entire face in the second image. Alternatively, the determination unit 120 may detect each of center coordinates of the entire face of the first image (e.g., center coordinates of an upper end and a lower end of the entire face, or center coordinates of a right end and a left end of the entire face) and center coordinates of the entire face in the second image. Alternatively, the determination unit 120 may detect a plurality of positions of the parts described above, and set a center position of the plurality of positions, as the position of the target. For example, the determination unit 120 may detect the right eye position, the left eye position, and the nose position, and may set a center position of the right eye position, the left eye position, and the nose position, as the position of the target. In a case where the target is not detected from at least one of the first image and the second image, the subsequent processing may be omitted, and the processing may be restarted from the step S101.

Subsequently, the determination unit 120 determines whether or not the difference between the position of the target in the first image and the position of the target in the second image is in the predetermined range (step S103). The result of the determination by the determination unit 120 is outputted to the control unit 130. When the difference between the position of the target in the first image and the position of the target in the second image is not in the predetermined range (the step S103: NO), the processing is restarted from the step S101.

On the other hand, when the difference between the position of the target in the first image and the position of the target in the second image is in the predetermined range (the step S103: YES), the control unit 130 performs the control of capturing the iris image of the target (step S104). Only one iris image may be captured, or a plurality of them may be captured. The iris image may be captured as each frame of a video.

Technical Effect

Next, a technical effect obtained by the information processing system 10 according to the first example embodiment will be described.

As described in FIG. 1 to FIG. 5, in the information processing system 10 according to the first example embodiment, the trigger determination is performed on the basis of the first image and the second image that are captured such that the optical axes intersect, and the iris image is captured in accordance with the result of the determination. In this way, it is possible to identify the position of the target and to capture the iris image as appropriate timing. Such an effect is pronounced, for example, in a case of using an iris camera with a relatively narrow focusing range. Furthermore, in the present example embodiment, since the trigger determination is performed by using the first image and the second image, it is not necessary separately provide a sensor or the like that detects the position of the target, for example. For example, it is conceivable to perform the trigger determination by using a distance sensor or a proximity sensor or the like, but in the present example embodiment, the distance sensor or the proximity sensor or the like is not required.

Second Example Embodiment

The information processing system 10 according to a second example embodiment will be described with reference to FIG. 6. The second example embodiment is partially different from the first example embodiment only in the operation, and may be the same as the first example embodiment in the other parts. For this reason, a part that is different from the first example embodiment will be described in detail below, and a description of the other overlapping parts will be omitted as appropriate.

(Flow of Operation)

First, with reference to FIG. 6, a flow of operation of the information processing system 10 according to the second example embodiment will be described. FIG. 6 is a flowchart illustrating the flow of the operation of the information processing system according to the second example embodiment. In FIG. 6, the same steps as those illustrated in FIG. 5 carry the same reference numerals.

Figure 6:
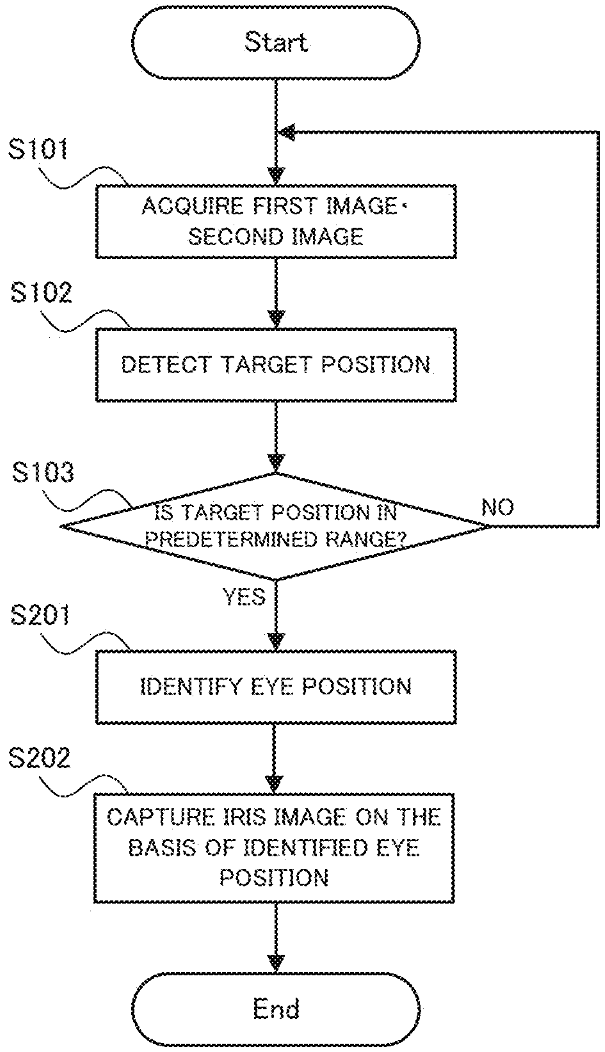
FIG. 6 is a flowchart illustrating a flow of operation of an information processing system according to a second example embodiment.

As illustrated in FIG. 6, when the operation of the information processing system 10 according to the second example embodiment is started, first, the acquisition unit 110 acquires the first image and the second image (step S101). The first image and the second image acquired in the acquisition unit 110 are outputted to the determination unit 120.

Subsequently, the determination unit 120 detects the position of the target from each of the first image and the second image acquired by the acquisition unit 110 (step S102). Then, the determination unit 120 determines whether or not the difference between the position of the target in the first image and the position of the target in the second image is in the predetermined range (step S103). The result of the determination by the determination unit 120 is outputted to the control unit 130. When the difference between the position of the target in the first image and the position of the target in the second image is not in the predetermined range (the step S103: NO), the processing is restarted from the step S101.

On the other hand, when the difference between the position of the target in the first image and the position of the target in the second image is in the predetermined range (the step S103: YES), the control unit 130 identifies the eye position of the target, by using the first image and the second image (step S201). Although there is no specific limitation on a method of identifying the eye position of the target, an area including the face of the target (a face area) may be detected, and the eye position may be estimated from the detected face area, for example.

Subsequently, the control unit 130 performs a control of capturing the iris image of the target, on the basis the identified eye position (step S202). For example, the control unit 130 may perform the control of moving the camera 18 to a position where the identified eye position can be captured, to start the imaging. Alternatively, the control unit 130 may perform the control of selecting the camera 18 capable of imaging the identified eye position, from among a plurality of cameras 18 at different levels, to start the imaging. Alternatively, the control unit 130 may perform the control of changing an imaging range such that the identified eye position can be captured by rotating the mirror provided in the camera 18, to start the imaging. For example, it is possible to start the imaging after changing the imaging range of the camera 18, by disposing the mirror in the imaging range of the camera 18 (i.e., such that the camera 18 images the target through the mirror) and performing rotary drive on the mirror in accordance with the eye position of the target. For example, it is possible to acquire the iris image by performing rotary drive on the mirror in accordance with the eye position of the target. Moving the camera 18, selecting the camera 18, and driving the mirror described above may be performed on the basis of a position other than the eye position (i.e., the position of a part that is different from the eyes). For example, on the basis of the nose position or the face position of the target, the camera 18 may be moved, or the camera 18 may be selected, or the rotary drive of the mirror may be performed. For example, it is possible to acquire a face image on the basis of the face position, or the nose position located near the center of the face.

Technical Effect

Next, a technical effect obtained by the information processing system 10 according to the second example embodiment will be described.

As illustrated in FIG. 4, in the information processing system 10 according to the second example embodiment, the iris image is captured on the basis of the identified eye position. In this way, it is possible to capture the iris image of the target, more properly. Specifically, the imaging is possible with the iris of the target included in the imaging range.

Third Example Embodiment

The information processing system 10 according to a third example embodiment will be described with reference to FIG. 7. The third example embodiment is partially different from the first and second example embodiments only in the operation, and may be the same as the first and second example embodiments in the other parts. For this reason, a part that is different from each of the example embodiments described above will be described in detail below, and a description of the other overlapping parts will be omitted as appropriate.

(Detection of Target Position)

First, with reference to FIG. 7, a method of detecting a target position (i.e., the position of the target in each of the first image and the second image) in the information processing system 10 according to the third example embodiment will be described. FIG. 7 is a plan view illustrating an example of the first image and the second image acquired by the information processing system according to the third example embodiment.

Figure 7:
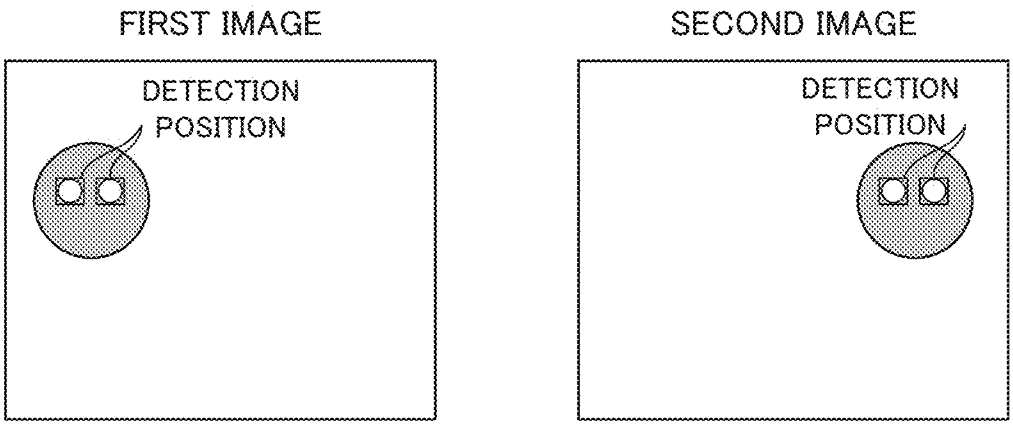
FIG. 7 is a plan view illustrating an example of a first image and a second image acquired by an information processing system according to a third example embodiment.
Figure 7:
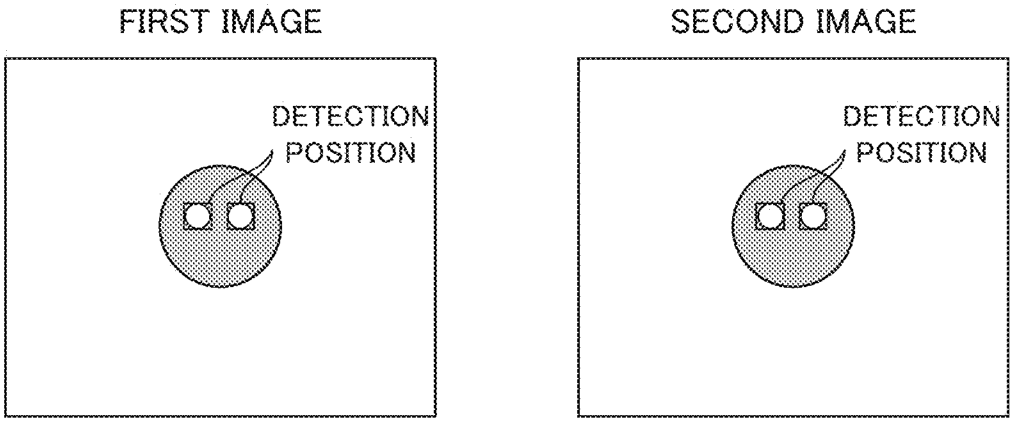

As illustrated in FIG. 7, in the information processing system 10 according to the third example embodiment, the position of the right eye and the position of the left eye of the target are detected as the position of the target in the first image and the second image. For example, the position of the target may be detected as coordinates indicating the position of the right eye of the target and coordinates indicating the position of the left eye of the target. The position of the right eye may be a center point in a right eye area, a position of an area indicating the right eye area, a center point in an iris area of the right eye, a position of an area indicating the iris area of the right eye, or a center point in a pupil area of the right eye. Similarly, the position of the left eye may be a center point in a left eye area, a position of an area indicating the left eye area, a center point in an iris area of the left eye, a position of an area indicating the iris area of the left eye, or a center point in a pupil area of the left eye. In this instance, the trigger determination may be performed by using both the position of the right eye and the position of the left eye of the target. For example, in a case where a difference between the position of the right eye of the target in the first image and the position of the right eye of the target in the second image, and a difference between the position of the left eye of the target in the first image and the position of the left eye of the target in the second image are calculated, and the difference is in the predetermine range both for the right eye and the left eye, the control of capturing the iris image may be performed. Alternatively, in a case where the difference is in the predetermine range for only one of the right eye and the left eye, the control of capturing the iris image may be performed.

Technical Effect

Next, a technical effect obtained by the information processing system 10 according to the third example embodiment will be described.

As described in FIG. 7, in the information processing system 10 according to the third example embodiment, the position of the right eye and the position of the left eye are detected as the position of the target. In this way, since the trigger determination is performed on the basis of the position of the eye (in other words, the position of the iris) of the target, it is possible to transmit the appropriate timing of capturing the iris image (a transmission destination may be a human or a machine). Furthermore, by using the position of the target detected, imaging control based on the position of the eye may also be performed as in the second example embodiment described above.

Fourth Example Embodiment

The information processing system 10 according to a fourth example embodiment will be described with reference to FIG. 8 and FIG. 9. The fourth example embodiment is partially different from the first to third example embodiments only in the configuration and operation, and may be the same as the first to third example embodiments in the other parts. For this reason, a part that is different from each of the example embodiments described above will be described in detail below, and a description of the other overlapping parts will be omitted as appropriate.

(Setting of Trigger Position)

First, with reference to FIG. 8, a trigger position in the information processing system 10 according to the fourth example embodiment will be described. FIG. 8 is a top view illustrating the trigger position and a focus position in the information processing system according to the fourth example embodiment.

Figure 8:
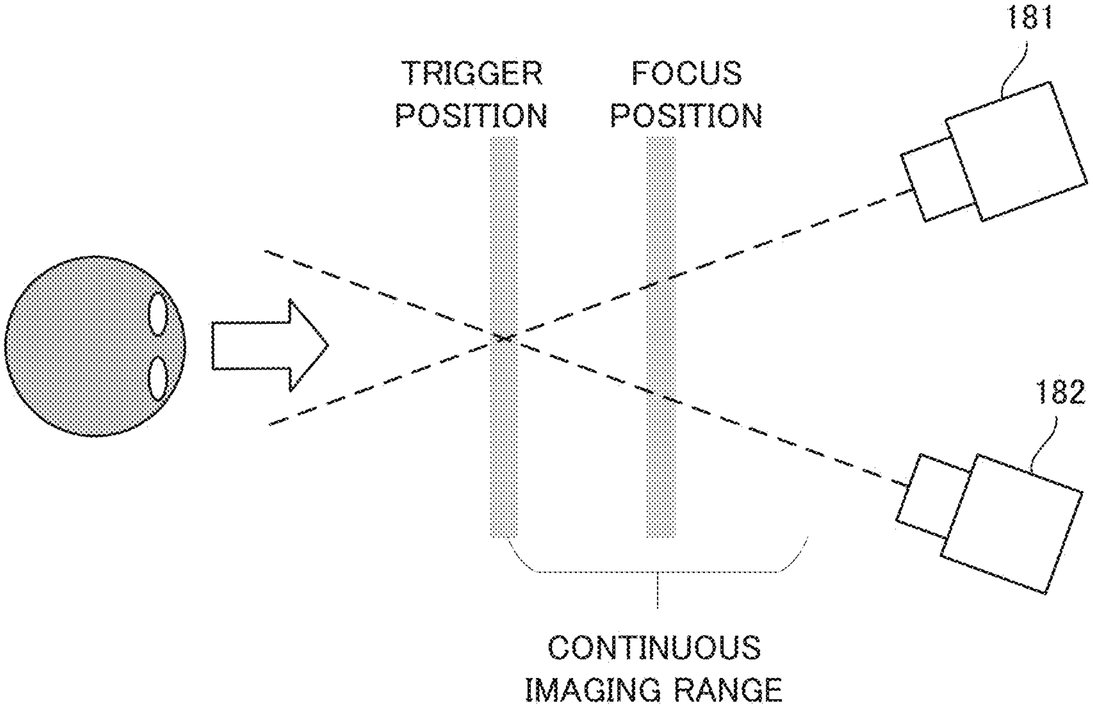
FIG. 8 is a top view illustrating a trigger position and a focus position in an information processing system according to a fourth example embodiment.

As illustrated in FIG. 8, the information processing system according to the fourth example embodiment assumes a situation in which the target approaches the cameras that image the iris of the target. Especially in the fourth example embodiment, the trigger position (in this example, the point where the optical axis of the first camera 181 that captures the first image, intersects the optical axis of the second camera 182 that captures the second image) is set at a rear side of the focus position (i.e., the focusing position) when viewed from the cameras that image the iris of the target. In the fourth example embodiment, a plurality of iris images are continuously captured when it is determined that the target reaches the trigger position. The capture of the iris images is continuously performed at least until the target reaches the focus point beyond the trigger point. Therefore, the plurality of iris images captured include the iris image captured at the focus position. Furthermore, the capture of the iris images may also be performed even after the target reaches the focus position. For example, the capture of the iris images may be ended after a predetermined number of images are captured after the target reaches the focus. When the iris images are continuously captured, the imaging may be performed, with the imaging range matching the eye position of the target. For example, the iris image of the target may be captured at a level of the eye position estimated from a height of the target. In the present example embodiment, as already described, since the position (depth information) of the target may be identified by using the first image and the second image, it is possible to accurately estimate the height of the target. Specifically, the height of the target may be estimated (calculated) by using the depth information, a size of the target in the image, and imaging angles of the cameras. In this situation, it is possible to properly estimate the height of the target even if there is no reference target object that is a reference of a length in the image.

(Flow of Operation)

Next, with reference to FIG. 9, a flow of operation by the information processing system 10 according to the fourth example embodiment will be described. FIG. 9 is a flowchart illustrating the flow of the operation of the information processing system according to the fourth example embodiment. In FIG. 9, the same steps as those illustrated in FIG. 5 carry the same reference numerals.

Figure 9:
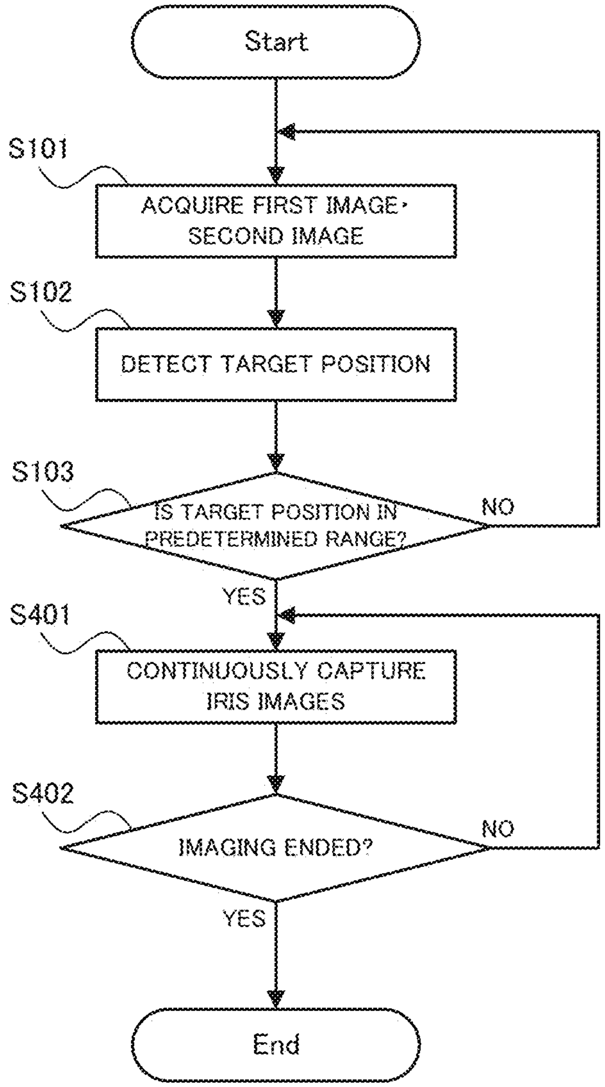
FIG. 9 is a flowchart illustrating a flow of operation of the information processing system according to the fourth example embodiment.

As illustrated in FIG. 9, when the operation of the information processing system 10 according to the fourth example embodiment is started, first, the acquisition unit 110 acquires the first image and the second image (step S101). The first image and the second image acquired in the acquisition unit 110 are outputted to the determination unit 120.

Subsequently, the determination unit 120 detects the position of the target from each of the first image and the second image acquired by the acquisition unit 110 (step S102). Then, the determination unit 120 determines whether or not the difference between the position of the target in the first image and the position of the target in the second image is in the predetermined range (step S103). The result of the determination by the determination unit 120 is outputted to the control unit 130. When the difference between the position of the target in the first image and the position of the target in the second image is not in the predetermined range (the step S103: NO), the processing is restarted from the step S101.

On the other hand, when the difference between the position of the target in the first image and the position of the target in the second image is in the predetermined range (the step S103: YES), the control unit 130 continuously captures the iris images (step S401). Thereafter, the control unit 130 determines whether or not to end the continuous imaging (step S402). The control unit 130 may determine to end the continuous imaging, for example, when the target passes through the focus position (see FIG. 8). Alternatively, the control unit 130 may determine to end the imaging at the timing when the difference between the position of the target in the first image and the position of the target in the second image is no longer in the predetermined range.

When the control unit 130 does not determine to end the imaging (the step S402: NO), the continuous imaging of the iris image is continued. On the other hand, when the control unit 130 determines to end the imaging (the step S402: YES), the continuous imaging of the iris image is ended, and a series of operation steps are ended.

Technical Effect

Next, a technical effect obtained by the information processing system 10 according to the fourth example embodiment will be described.

As described in FIG. 8 and FIG. 9, in the information processing system 10 according to the fourth example embodiment, the trigger position (i.e., the position where the optical axes intersect) is set at the rear side of the focus position of the cameras that image the iris, and when the target reaches the trigger position, the iris images are captured continuously. In this way, it is possible to properly image the iris of the target approaching the camera, at the focus position.

Fifth Example Embodiment

The information processing system 10 according to a fifth example embodiment will be described with reference to FIG. 10 and FIG. 11. The fifth example embodiment is partially different from the fourth example embodiment only in the configuration and operation, and may be the same as the first to fourth example embodiments in the other parts. For this reason, a part that is different from each of the example embodiments described above will be described in detail below, and a description of the other overlapping parts will be omitted as appropriate.

(Functional Configuration)

First, with reference to FIG. 10, a functional configuration of the information processing system 10 according to the fifth example embodiment will be described. FIG. 10 is a block diagram illustrating the functional configuration of the information processing system according to the fifth example embodiment. In FIG. 10, the same components as those illustrated in FIG. 2 carry the same reference numerals.

Figure 10:
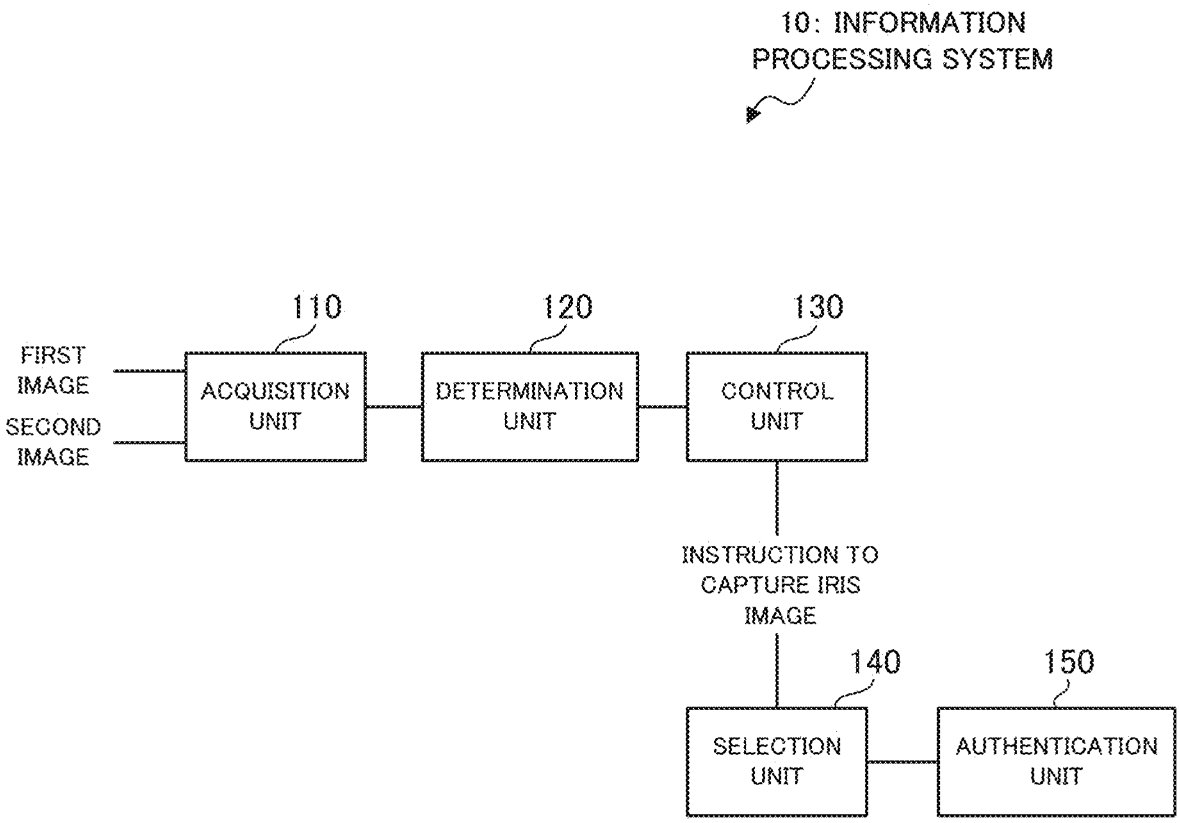
FIG. 10 is a block diagram illustrating a functional configuration of an information processing system according to a fifth example embodiment.

As illustrated in FIG. 10, the information processing system 10 according to the fifth example embodiment includes, as components for realizing the functions thereof, the acquisition unit 110, the determination unit 120, the control unit 130, a selection unit 140, and an authentication unit 150. That is, the information processing system 10 according to the fifth example embodiment further includes the selection unit 140 and the authentication unit 150, in addition to the configuration in the first example embodiment (see FIG. 2). Each of the selection unit 140 and the authentication unit 150 may be, for example, a processing block realized or implemented by the processor 11 (see FIG. 1).

The selection unit 140 is configured to be select at least one high-quality iris image, from a plurality of iris images that are continuously captured after the trigger determination. Note that the quality of the iris image may be determined, for example, by calculating a quality score (i.e., a score indicating the quality of the image). For example, the selection unit 140 may select one image with the highest quality score from the plurality of iris images. Alternatively, the selection unit 140 may select a predetermined number of images in descending order of the quality score. Alternatively, the selection unit 140 may select an image(s) whose quality score exceeds a predetermined value.

The authentication unit 150 is configured to perform a biometric authentication processing (iris authentication), on the basis of the iris image of the target captured as a result of the control by the control unit 130. Since a specific method of the iris authentication can adopt the existing techniques/technologies as appropriate, a detailed description thereof shall be omitted here. The authentication unit 150 may be configured to perform various processing in accordance with a result of the iris authentication. For example, the authentication unit 150 may be configured to perform a processing of unlocking a gate in a case where the iris authentication is successful.

(Flow of Operation)

Next, with reference to FIG. 11, a flow of operation by the information processing system 10 according to the fifth example embodiment will be described. FIG. 11 is a flowchart illustrating the flow of the operation of the information processing system according to the fifth example embodiment. In FIG. 11, the same steps as those illustrated in FIG. 9 carry the same reference numerals.

Figure 11:
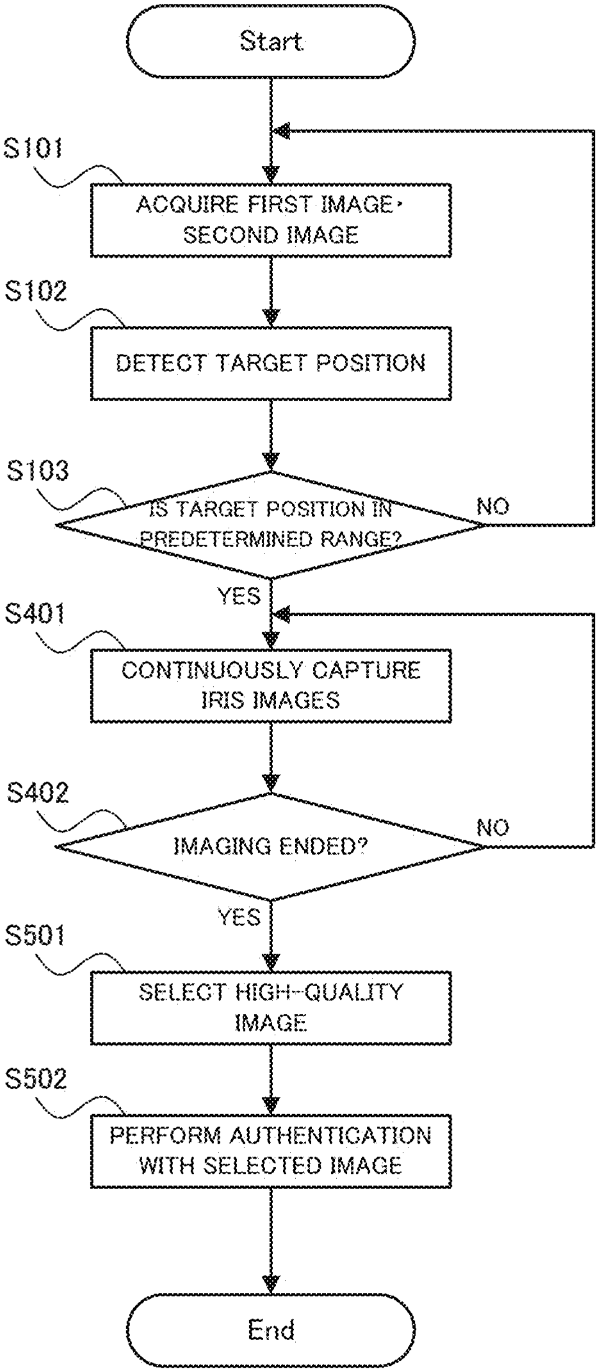
FIG. 11 is a flowchart illustrating a flow of operation of the information processing system according to the fifth example embodiment.

As illustrated in FIG. 11, when the operation of the information processing system 10 according to the fifth example embodiment is started, first, the acquisition unit 110 acquires the first image and the second image (step S101). The first image and the second image acquired in the acquisition unit 110 are outputted to the determination unit 120.

Subsequently, the determination unit 120 detects the position of the target from each of the first image and the second image acquired by the acquisition unit 110 (step S102). Then, the determination unit 120 determines whether or not the difference between the position of the target in the first image and the position of the target in the second image is in the predetermined range (step S103). The result of the determination by the determination unit 120 is outputted to the control unit 130. When the difference between the position of the target in the first image and the position of the target in the second image is not in the predetermined range (the step S103: NO), the processing is restarted from the step S101.

On the other hand, when the difference between the position of the target in the first image and the position of the target in the second image is in the predetermined range (the step S103: YES), the control unit 130 continuously captures the iris images (step S401). Thereafter, the control unit 130 determines whether or not to end the continuous imaging (step S402). When the control unit 130 does not determine to end the imaging (the step S402: NO), the continuous imaging of the iris image is continued.

On the other hand, when the control unit 130 determines to end the imaging (the step S402: YES), the continuous imaging of the iris image is ended, and the selection unit 140 selects at least one high-quality image from the plurality of iris images captured so far (step S501). Then, by using the iris image selected by the selection unit 140, the authentication unit 150 performs the iris authentication (step S502).

Technical Effect

Next, a technical effect obtained by the information processing system 10 according to the fifth example embodiment will be described.

As described in FIG. 10 and FIG. 11, in the information processing system 10 according to the fifth example embodiment, the high-quality image is selected from the plurality of iris images, and the authentication processing is performed by using the selected image. In this way, the use of the high-quality iris image makes it possible to perform the authentication processing, and it is thus possible to realize high-accuracy biometric authentication.

Sixth Example Embodiment

The information processing system 10 according to a sixth example embodiment will be described with reference to FIG. 12. The sixth example embodiment is partially different from the first to fifth example embodiments only in the configuration, and may be the same as the first to fifth example embodiments in the other parts. For this reason, a part that is different from each of the example embodiments described above will be described in detail below, and a description of the other overlapping parts will be omitted as appropriate.

(Camera Configuration)

First, with reference to FIG. 12, a camera configuration of the information processing system 10 according to the sixth example embodiment will be described. FIG. 12 is a block diagram illustrating a functional configuration of the information processing system according to the sixth example embodiment. In FIG. 12, the same components as those illustrated in FIG. 2 carry the same reference numerals.

Figure 12:
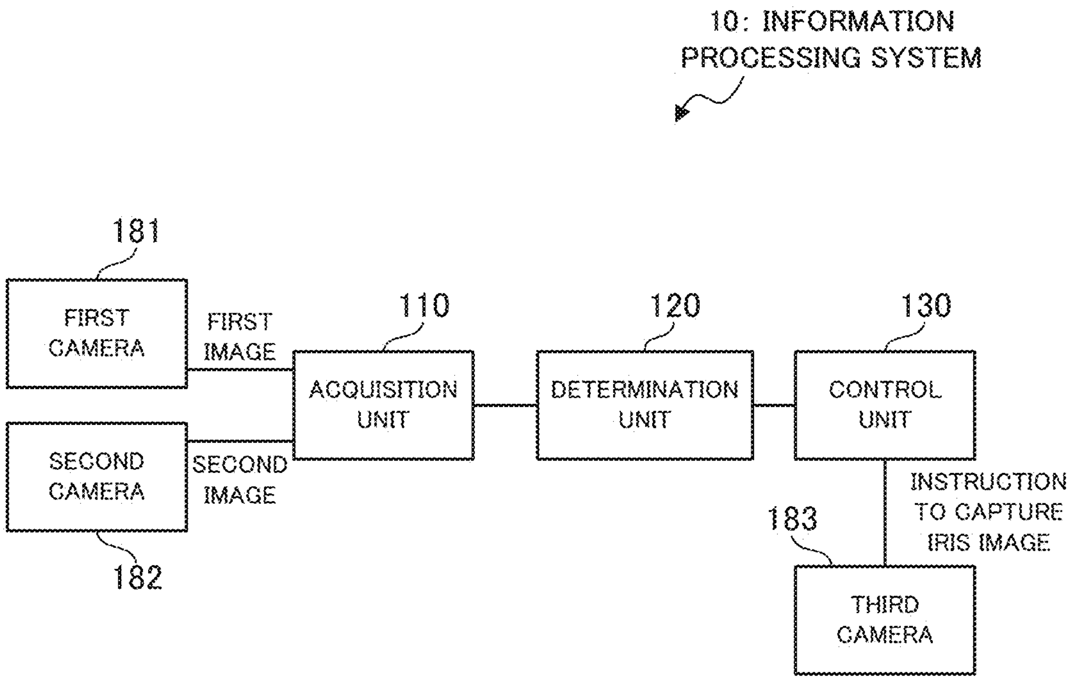
FIG. 12 is a block diagram illustrating a functional configuration of an information processing system according to a sixth example embodiment.

As illustrated in FIG. 12, the information processing system 10 according to the sixth example embodiment includes, as the camera 18, the first camera 183, the second camera 182, and a third camera 183. The first camera 181 is provided as a camera that captures the first image. The second camera 182 is provided as a camera that captures the second image. The first image and the second image respectively captured by the first camera 181 and the second camera 182 are configured to be acquired by the acquisition unit 110. The first camera 181 and the second camera 182, as illustrated in FIG. 3, are arranged such that the optical axes intersect. The third camera 183 is provided as a near-infrared camera that captures the iris image. Therefore, the third camera 183 is controllable by the control unit 130. A specific arrangement example of the first camera 181, the second camera 182, and the third camera will be described in detail in another example embodiment later.

The first camera 181 and the second camera 182 described above may be calibrated in advance. In this case, it is possible to acquire the position (the depth information) of the target with high accuracy by using stereo vision. Since the first camera 181 and the second camera 182 are arranged such that the optical axes intersect, it is possible to acquire the depth information with high accuracy, by limiting a stereo search range to a center of a field angle and by using corresponding point information (e.g., information about eyes coordinates, face part coordinates, etc.) of the target determined to be near the trigger.

Technical Effect

Next, a technical effect obtained by the information processing system 10 according to the sixth example embodiment will be described.

As described in FIG. 12, in the information processing system 10 according to the sixth example embodiment, the first image is captured by the first camera 181, the second image is captured by the second camera 182, and the iris image is captured by the third camera 183. In this way, it is possible to properly capture the first image, the second image, and a third image (iris image) by using the plurality of cameras. In addition, it is possible to determine the position of the target with higher accuracy, as compared with a case where the first image and the second image are captured by using a single common camera.

Seventh Example Embodiment

The information processing system 10 according to a seventh example embodiment will be described with reference to FIG. 13. The seventh example embodiment describes a specific arrangement example of the cameras in the sixth example embodiment, and may be the same as the first to sixth example embodiments in the other parts. For this reason, a part that is different from each of the example embodiments described above will be described in detail below, and a description of the other overlapping parts will be omitted as appropriate.

(Camera Arrangement)

First, with reference to FIG. 13, a camera arrangement of the information processing system 10 according to the seventh example embodiment will be described. FIG. 13 is a top view illustrating an arrangement example of the first camera, the second camera, and the third camera in the information processing system according to the seventh example embodiment. In FIG. 13, the same components as those illustrated in FIG. 12 carry the same reference numerals.

Figure 13:
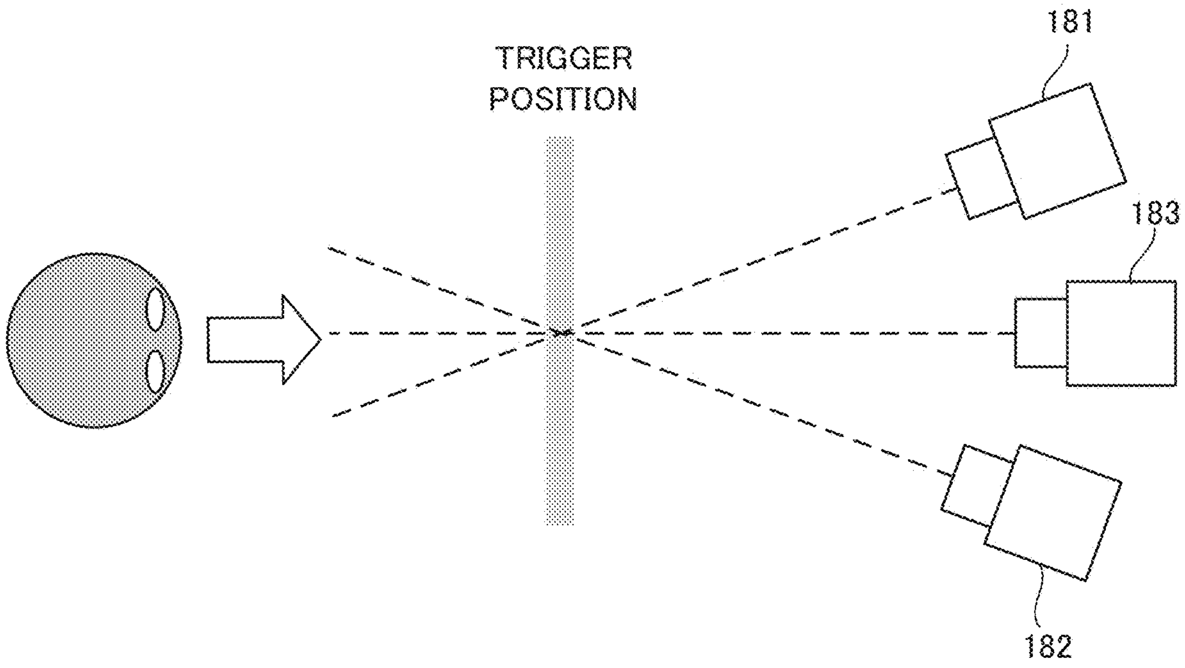
FIG. 13 is a top view illustrating an arrangement example of a first camera, a second camera, and a third camera in an information processing system according to a seventh example embodiment.

As illustrated in FIG. 13, in the information processing system 10 according to the seventh example embodiment, the third camera 183 is disposed in front of the target approaching the cameras. In this case, the "front" is a position where the face of the target can be captured from the front (i.e., a position facing the target). The first camera 181 and the second camera 182 are disposed on the left and right of the third camera. Here, although the first camera 181 is disposed on the right side of the third camera 183 and the second camera 182 is disposed on the left side of the third camera 183, the second camera 182 may be disposed on the right side of the third camera 183 and the first camera 181 may be disposed on the left side of the third camera 183.

Technical Effect

Next, a technical effect obtained by the information processing system 10 according to the seventh example embodiment will be described.

As described in FIG. 13, in the information processing system 10 according to the seventh example embodiment, the third camera 183 is disposed in front of the target, and the first camera 181 and the second camera 182 are disposed on the left and right of the third camera 183. In this way, it is possible to capture the iris image at an appropriate angle from the front of the target. Furthermore, the first image and the second image may be properly captured such that the optical axes intersect.

Eighth Example Embodiment

The information processing system 10 according to the eighth example embodiment will be described with reference to FIG. 14. As in the seventh example embodiment, the eighth example embodiment describes a specific arrangement example of the cameras in the sixth example embodiment, and may be the same as the first to sixth example embodiments in the other parts. For this reason, a part that is different from each of the example embodiments described above will be described in detail below, and a description of the other overlapping parts will be omitted as appropriate.

(Camera Arrangement)

First, with reference to FIG. 14, a camera arrangement of the information processing system 10 according to the eighth example embodiment will be described. FIG. 14 is a top view illustrating an arrangement example of the first camera, the second camera, and the third camera in the information processing system according to the eighth example embodiment. In FIG. 14, the same components as those illustrated in FIG. 13 carry the same reference numerals.

Figure 14:
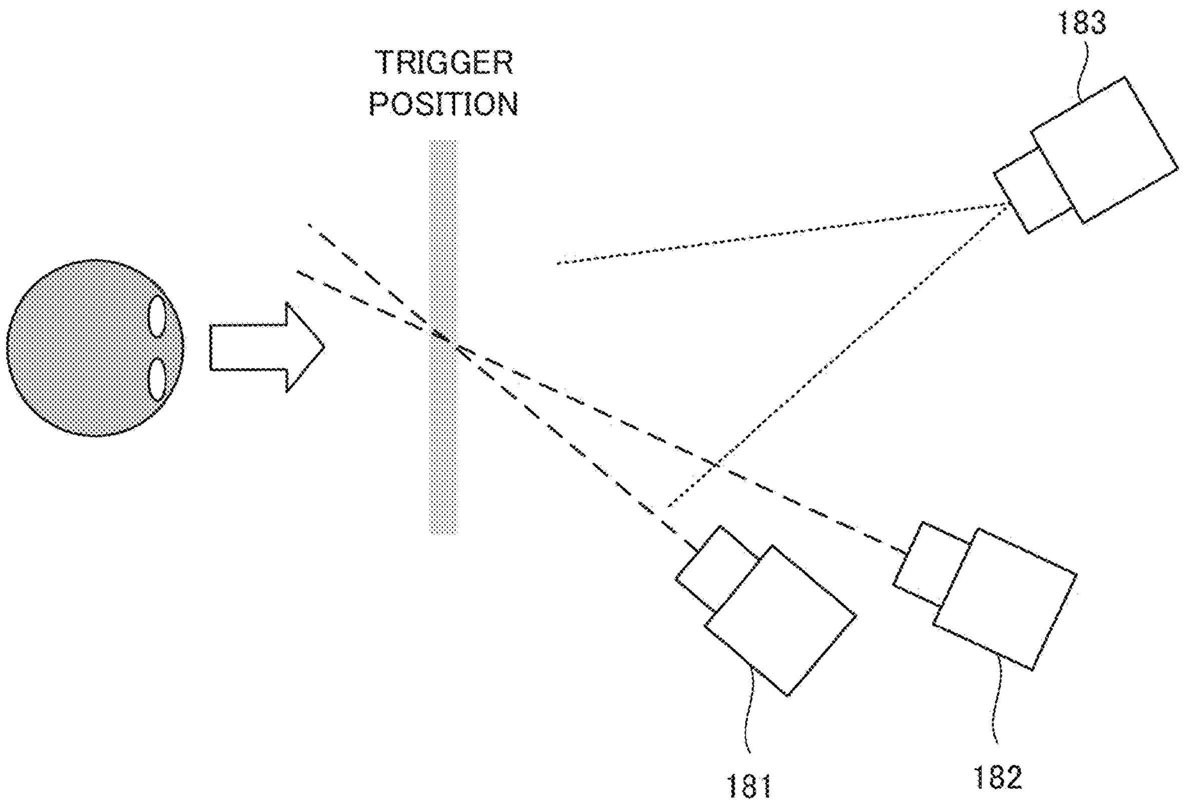
FIG. 14 is a top view illustrating an arrangement example of a first camera, a second camera, and a third camera in an information processing system according to an eighth example embodiment.

As illustrated in FIG. 14, in the information processing system 10 according to the eighth example embodiment, each of the first camera 181, the second camera 182, and the third camera 183 is disposed at a position where the target can be imaged diagonally. The term "diagonally" here means, at an angle deviated from the front of the target.

FIG. 14 describes an example in which the first camera 181 and the second camera 182 are disposed on the right side when viewed from the target, and the third camera 183 is disposed on the left side when viewed from the target; however, the camera configuration in the present example embodiment is not limited to this arrangement. For example, all of the first camera 181, the second camera 182, and the third camera 183 may be disposed on the right side when viewed from the target. Furthermore, the first camera 181 may be disposed on the right side when viewed from the target, and the second camera 182 may be disposed on the left side when viewed from the target.

Technical Effect

Next, a technical effect obtained by the information processing system 10 according to the eighth example embodiment will be described.

As described in FIG. 14, in the information processing system 10 according to the eighth example embodiment, each of the first camera 181, the second camera 182, and the third camera 183 is disposed such that the target is imaged diagonally at an angle deviated from the front. In this way, it is possible to capture the first image, the second image, and the iris image of the target without interfering with the target approaching the cameras.

Ninth Example Embodiment

The information processing system 10 according to a ninth example embodiment will be described with reference to FIG. 15 and FIG. 16. The ninth example embodiment is partially different from the first to eighth example embodiments only in the configuration and operation, and may be the same as the first to eighth example embodiments in the other parts. For this reason, a part that is different from each of the example embodiments described above will be described in detail below, and a description of the other overlapping parts will be omitted as appropriate.

(Camera Configuration)

First, with reference to FIG. 15, a camera configuration of the information processing system 10 according to the ninth example embodiment will be described. FIG. 15 is a front view illustrating an arrangement example of a fourth camera and a mirror in the information processing system according to the ninth example embodiment.

Figure 15:
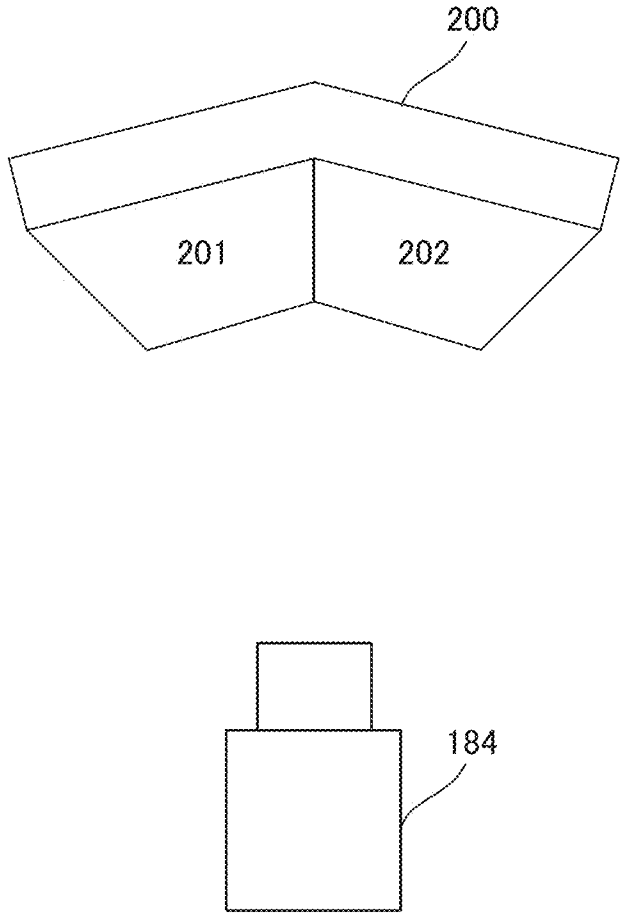
FIG. 15 is a front view illustrating an arrangement example of a fourth camera and a mirror in an information processing system according to a ninth example embodiment.

As illustrated in FIG. 15, in the information processing system 10 according to the ninth example embodiment, a fourth camera 184 is provided as a camera that captures the first image and the second image. The fourth camera 184 is disposed to face right above, and a mirror 200 is disposed above the camera. Thus, the fourth camera 184 includes the mirror 200 in the imaging range. The fourth camera 184 images the target (i.e., the first image and the second image) through the mirror 200.

The mirror 200 has a first surface 201 and a second surface 202 at different angles. The first surface is a surface provided to capture the first image, and the second surface 202 is a surface provided to capture the second image. Therefore, the first surface 201 and the second surface 202 are at the angles that allow an optical axis of the fourth camera 184 to intersect at the trigger point. Furthermore, the entire mirror 200 is disposed at an angle of 45 degrees with respect to a horizontal direction, for example. By making an angle of the mirror 200 in this way, the fourth camera 184 is allowed to image the front (i.e., a front side of the paper) through the mirror 200.

The first surface 201 and second surface 202 in the mirror 200 may not be clearly partitioned as illustrated in FIG. 15. For example, a part of the mirror 200 that is bent may be used as the first surface 201, and the other part may be used as the second surface 202. Furthermore, each of the first surface 201 and the second surface 202 in the mirror may be provided for another mirror. For example, a first mirror including the first surface 201 and a second mirror including second surface 202 may be separately provided to be at different angles from each other.

(First Image and Second Image)

Figure 16:
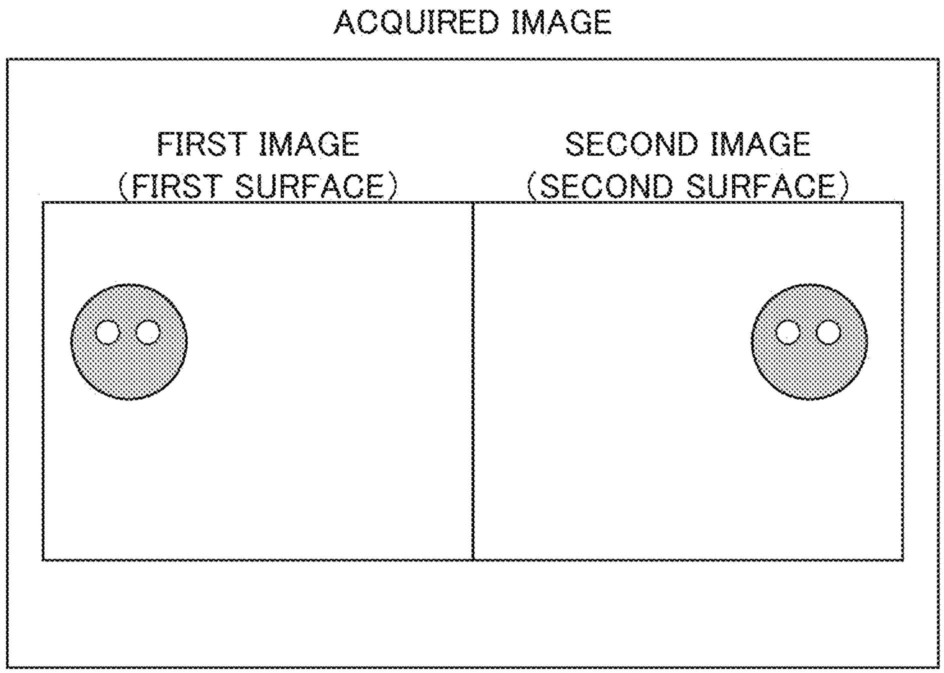
FIG. 16 is a plan view illustrating an example of a first image and a second image acquired by the information processing system according to the ninth example embodiment.

Next, with reference to FIG. 16, the first image and the second image t acquired by the information processing system 10 according to the ninth example embodiment will be specifically described. FIG. 16 is a plan view illustrating an example of the first image and the second image acquired by the information processing system according to the ninth example embodiment.

As illustrated in FIG. 16, in the information processing system 10 according to the ninth example embodiment, the first image and the second image are acquired as one image. Specifically, the acquired image includes the first image captured through the first surface 201 of the mirror 200, and the second image captured through the second surface 202. Even in a case where the first image and the second image are acquired as one image, it is possible to determine that the target reaches the trigger point by performing the arrangement that allows the optical axis intersects at the trigger point when the camera captures each of the images.

Technical Effect

Next, a technical effect obtained by the information processing system 10 according to the ninth example embodiment will be described.

As described in FIG. 15 and FIG. 16, in the information processing system 10 according to the ninth example embodiment, the first image and the second image are captured through the first surface 201 and the second surface 202 provided in the mirror 200. In this way, both the first image and the second image may be captured by a single camera (i.e., the fourth camera 184). Therefore, it is possible to reduce cost, as compared with the configuration that the first image and the second image are captured by a plurality of cameras.

In the above example, the mirror 200 includes two surfaces, but the mirror may include three or more surfaces. For example, the mirror 200 may include a third surface, in addition to first surface 201 and the second surface 202. Such a configuration may be realized, for example, by bending one mirror at two points, or may be realized by three mirrors. Each of the three surfaces may be provided, for example, as a surface for imaging the target from the right, a surface for imaging the target from the front, and a surface for imaging the target from the left. In this instance, in addition to the first image and the second image, a third image captured through the third surface may be used to determine that the target reaches the trigger point. In a case where the first image, the second image, and the third image are used, the determination unit 120 may determine whether or not a difference between the target position in the first image, the target position in the second image, and target position in the third image, is in a predetermined range. Then, when the difference between them is in the predetermined range, the iris image of the target may be captured. In addition, of the three surfaces, the surface for imaging the target from the front may be used to perform face authentication. Alternatively, face images reflected from the surface for imaging the target from the right side, the surface for imaging the target from the front, and the surface for imaging the target from the left side, may be used to perform the face authentication. In this case, a weight (i.e., a degree of impact on the face authentication) of the face image acquired from the surface for imaging the target from the front, may be set larger than that of the face image acquired from the other surfaces (i.e., the surface for imaging the target from the right side and the surface for imaging the target from the left side). This is because, a reliable face image (e.g., a face image facing the front) is more likely to be acquired in a case where the target is imaged from the front, as compared with a case where the target is imaged from the right side or the left side.

Tenth Example Embodiment

The information processing system 10 according to a tenth example embodiment will be described with reference to FIG. 17 and FIG. 18. The tenth example embodiment is partially different from the first to ninth example embodiments only in the configuration and operation, and may be the same the first to ninth example embodiments in the other parts. For this reason, a part that is different from each of the example embodiments described above will be described in detail below, and a description of the other overlapping parts will be omitted as appropriate.

(Camera Configuration)

First, with reference to FIG. 17, a camera configuration of the information processing system 10 according to the tenth example embodiment will be described. FIG. 17 is a top view illustrating an arrangement example of a fifth camera and a mirror in the information processing system according to the tenth example embodiment.

Figure 17:
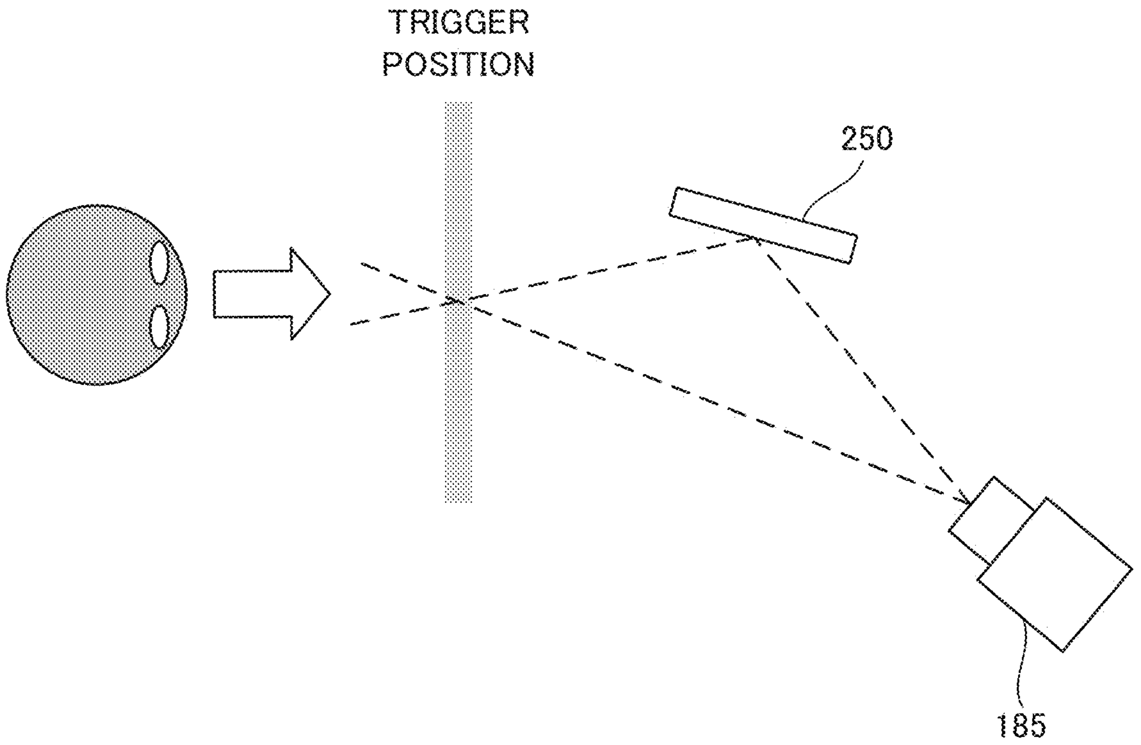
FIG. 17 is a top view illustrating an arrangement example of a fifth camera and a mirror in an information processing system according to a tenth example embodiment.

As illustrated in FIG. 17, in the information processing system 10 according to the tenth example embodiment, a fifth camera 185 is provided as a camera that captures the first image and the second image. A mirror 250 is provided in an imaging range of the fifth camera 185. The fifth camera 185 and the mirror 250 are arranged such that an optical axis extending directly toward the trigger position from the fifth camera 185 intersects an optical axis extending toward the trigger position through the mirror 250 from the fifth camera 185.

(First Image and Second image)

Figure 18:
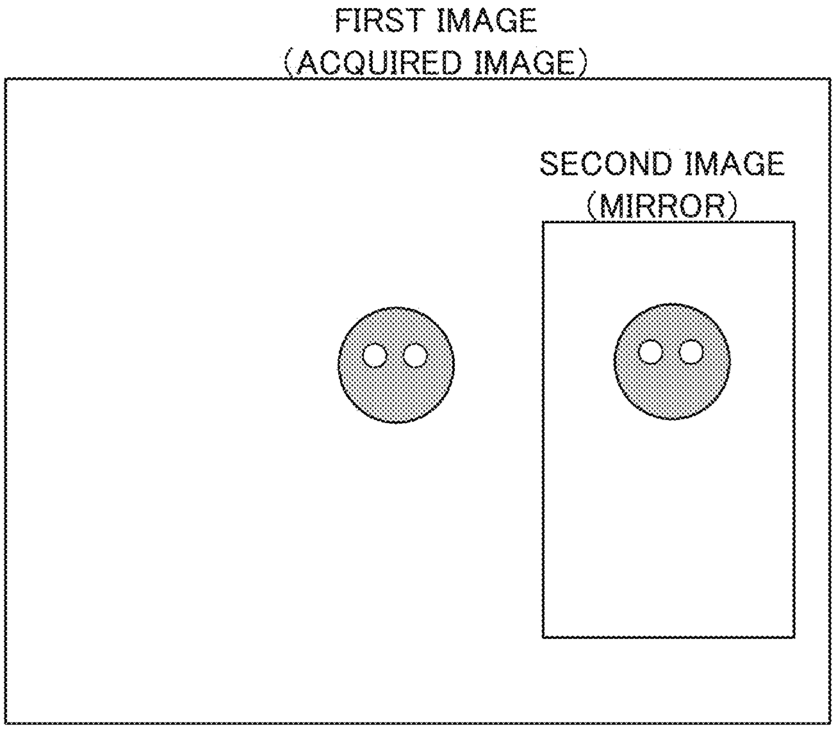
FIG. 18 is a plan view illustrating an example of a first image and a second image acquired by the information processing system according to the tenth example embodiment.

Next, with reference to FIG. 18, the first image and the second image acquired by the information processing system 10 according to the tenth example embodiment will be specifically described. FIG. 18 is a plan view illustrating an example of the first image and the second image acquired by the information processing system according to the tenth example embodiment.

As illustrated in FIG. 18, in the information processing system 10 according to the tenth example embodiment, the first image and the second image are acquired as one image. Specifically, the first image acquired by directly imaging the target, includes the second image captured through the mirror 250. Even in a case where the first image and the second image are acquired as one image, it is possible to determine that the target reaches the trigger point by performing the arrangement that allows the optical axes intersect at the trigger point when the each of the images is captured. For example, in the example illustrated in FIG. 18, the target appears near the center of the first image (i.e., near the center of the entire acquired image), and the target appears near the center of the second image (i.e., near the center of the mirror 250). Therefore, in such a case, it can be determined that the target is at the trigger point.

Technical Effect

Next, a technical effect obtained by the information processing system 10 according to the tenth example embodiment will be described.

As described in FIG. 17 and FIG. 18, in the information processing system 10 according to the tenth example embodiment, the target is directly imaged by the fifth camera 185 and is also imaged through the mirror 250. In this way, it is possible to capture the first image and the second image by using a single camera (i.e., the fifth camera 185). Therefore, as compared with a case where the first image and the second image are captured by a plurality of cameras, the cost can be reduced. Note that, by increasing the number of the mirrors or by bending the mirror to increase the number of surfaces, more image may be acquired by a single camera. For example, in a case where a first mirror and a second mirror are disposed in an imaging range of the fifth camera 185, it is possible to acquire the second image through the first mirror, and to acquire the third image through the second mirror. In this case, the imaging timing may be more accurately controlled by further using the third image in addition to the first image and the second image.

Eleventh Example Embodiment

The information processing system 10 according to an eleventh example embodiment will be described with reference to FIG. 19 and FIG. 20. The eleventh example embodiment is partially different from the first to tenth example embodiments only in the configuration and operation, and may be the same as the first to tenth example embodiments in the other parts. For this reason, a part that is different from each of the example embodiments described above will be described in detail below, and a description of the other overlapping parts will be omitted as appropriate.

(Functional Configuration)

First, with reference to FIG. 19, a functional configuration of the information processing system 10 according to the eleventh example embodiment will be described. FIG. 19 is a block diagram illustrating the functional configuration of the information processing system according to the eleventh example embodiment. In FIG. 19, the same components as those illustrated in FIG. 2 carry the same reference numerals.

Figure 19:
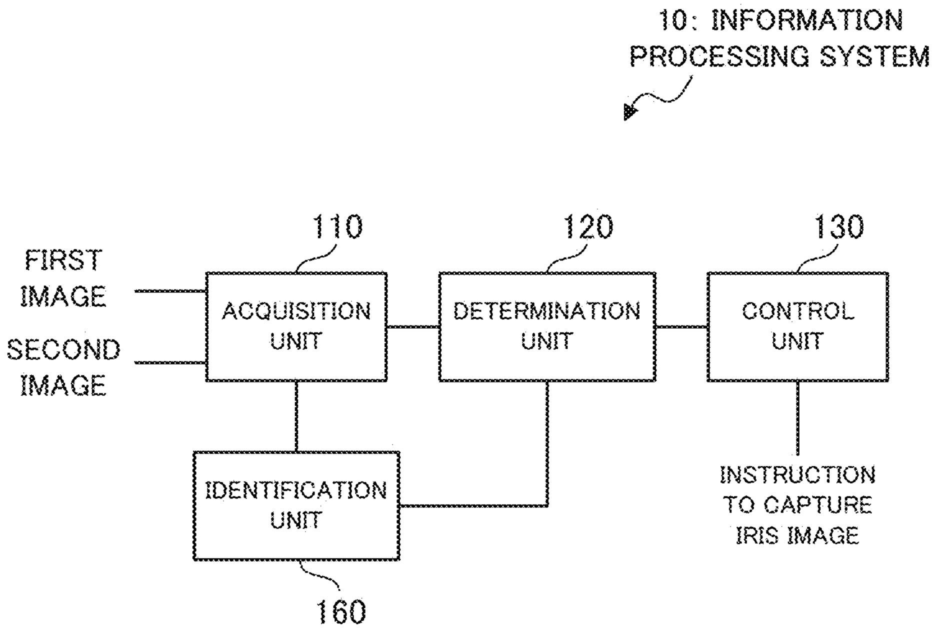
FIG. 19 is a block diagram illustrating a functional configuration of an information processing system according to an eleventh example embodiment.

As illustrated in FIG. 19, the information processing system 10 according to the eleventh example embodiment includes, as components for realizing the functions thereof, the acquisition unit 110, the determination unit 120, the control unit 130, and an identification unit 160. That is, the information processing system 10 according to the eleventh example embodiment further includes the identification unit **160*d*, in addition to the configuration in the first example embodiment (see FIG. 2). The identification unit 160 may be, for example, a processing block realized or implemented by the processor 11 (see FIG. 1**).

The identification unit 160 is configured to identify the target who performs the trigger determination (in other words, the target whose iris image is captured). As a result of the identification by the identification unit 160, in the determination unit 120, the trigger determination is performed by using the difference of the position in the first image and the position in the second image, of the target identified by the identification unit 160. The identification method of the specific portion 160 is not particularly limited, and any method that the target in the first image and the target in the second image may be guaranteed to be the same person, is sufficient. The identification unit 160 may identify the target, for example, by using the face authentication. In this instance, the face authentication may be performed by using the first image and the second image, or may be performed by using a separately captured image.

(Flow of Operation)

Next, with reference to FIG. 20, a flow of operation by the information processing system 10 according to the eleventh example embodiment will be described. FIG. 20 is a flowchart illustrating the flow of the operation of the information processing system according to the eleventh example embodiment. In FIG. 20, the same steps as those illustrated in FIG. 5 carry the same reference numerals.

Figure 20:
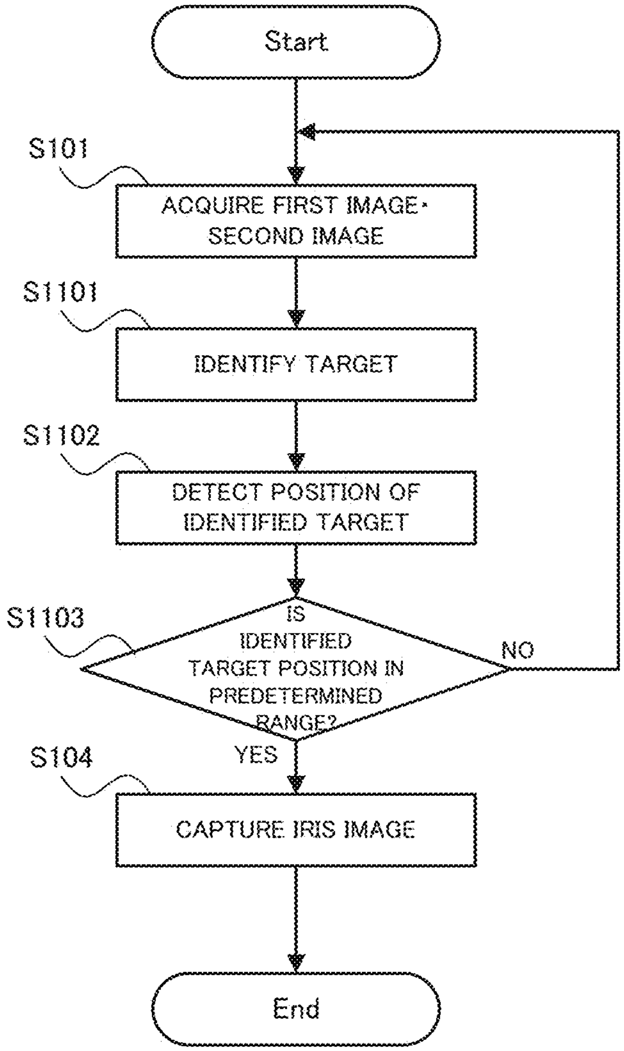
FIG. 20 is a flowchart illustrating a flow of operation of the information processing system according to the eleventh example embodiment.

As illustrated in FIG. 20, when the operation of the information processing system 10 according to the eleventh example embodiment is started, first, the acquisition unit 110 acquires the first image and the second image (step S101). The first image and the second image acquired by the acquisition unit 110 are outputted to the determination unit 120 and the identification unit 160.

Subsequently, the identification unit 160 identifies the target for the trigger determination (step S1101). Thereafter, the determination unit 120 detects the position of the target identified by the identification unit 160, from each of the first image and the second image acquired in the acquisition unit 110 (step S1102). The step S1101 and the step S1102 may be performed one after the other. That is, the step S1101 may be performed after the step S1102. In this case, the identification unit 160 may identify the target when it is determined in the determination unit 120 that the position of the target is in the predetermined range.

Subsequently, the determination unit 120 determines whether or not the difference between the position of the identified target in the first image and the position of the identified target in the second image is in the predetermined range (step S1103). The result of the determination by the determination unit 120 is outputted to the control unit 130. When the difference between the position of the identified target in the first image and the position of the identified target in the second image is not in the predetermined range (the step S1103: NO), the processing is restarted from the step S101.

On the other hand, when the difference between the position of the identified target in the first image and the position of the identified target in the second image is in the predetermined range (the step S1103: YES), the control unit 130 performs the control of capturing the iris image of the target (step S104).

In the information processing system 10 according to the eleventh example embodiment, only when the target who is included in the first image and the target who is included in the second image are the same person (i.e., the identified target), the trigger determination for the target is performed. Therefore, for example, in a case where the first image includes a first target and the second image includes a second target, a difference between a first target position in the first image and a second target position in the second image is not used for the trigger determination.

Technical Effect

Next, a technical effect obtained by the information processing system 10 according to the eleventh example embodiment will be described.

As described in FIG. 19 and FIG. 20, in the information processing system 10 according to the eleventh example embodiment, after the target is identified, the trigger determination using the first image and the second image is performed. In this way, it is possible to prevent that erroneous trigger determination based on the positions of different targets is performed.

Twelfth Example Embodiment

The information processing system 10 according to a twelfth example embodiment will be described with reference to FIG. 21. The twelfth example embodiment is partially different from the first to eleventh example embodiments only in the operation, and may be the same as the first to eleventh example embodiments in the other part. For this reason, a part that is different from each of the example embodiments described above will be described in detail below, and a description of the other overlapping parts will be omitted as appropriate.

(Flow of Operation)

First, a flow of operation by the information processing system 10 according to the twelfth example embodiment will be described with reference to FIG. 21. FIG. 21 is a flowchart illustrating the flow of the operation of the information processing system according to the twelfth example embodiment. In FIG. 21, the same steps as those illustrated in FIG. 5 carry the same reference numerals.

Figure 21:
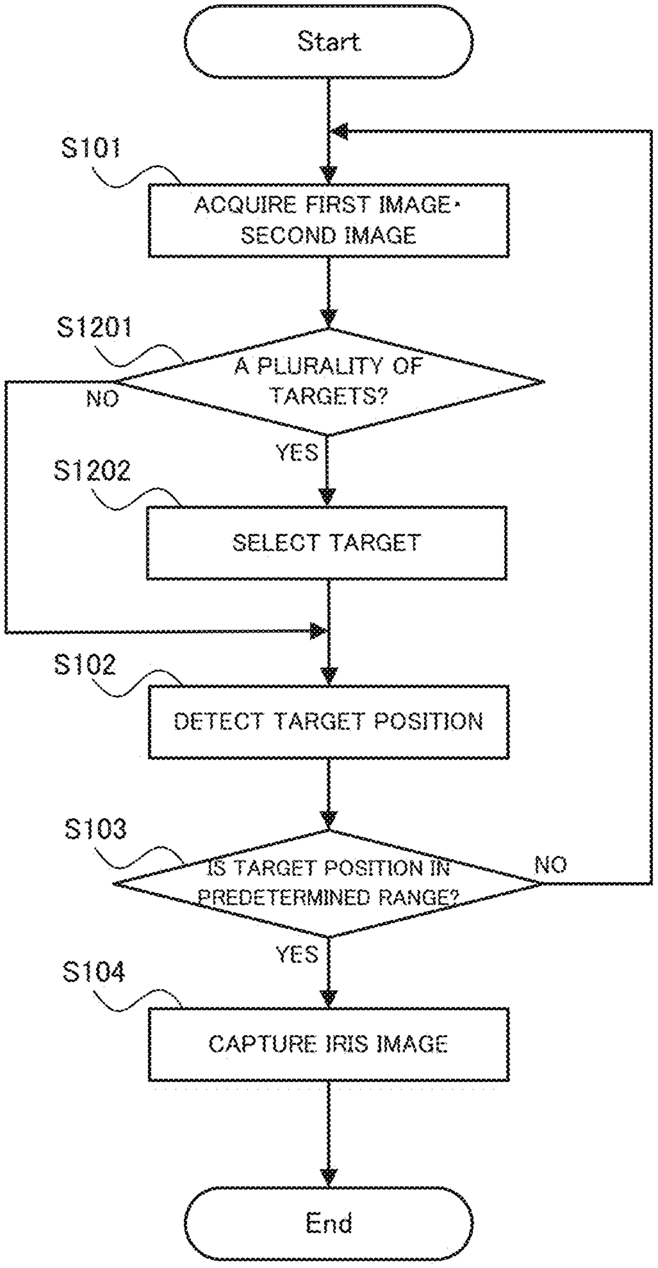
FIG. 21 is a flowchart illustrating a flow of operation of an information processing system according to a twelfth example embodiment.

As illustrated in FIG. 21, when the operation of the information processing system 10 according to the twelfth example embodiment is started, first, the acquisition unit 110 acquires the first image and the second image (step S101).

The first image and the second image acquired in the acquisition unit 110 are outputted to the determination unit 120.

Subsequently, the determination unit 120 determines whether or not the first image and the second image include a plurality of targets (step S1201). When the first image and the second image include the plurality of targets (the step S1201: YES), the determination unit 120 selects one target from the plurality of targets (step S1202). The determination unit 120 may select, for example, a target who is the closest to the camera (e.g., the largest target in the image). Note that the following processing is performed on the target selected in the step S1202. When the first image and the second image do not include the plurality of targets (step S1201: NO), the step S1202 may be omitted.

Subsequently, the determination unit 120 detects the position of the target from each of the first image and the second image acquired by the acquisition unit 110 (step S102). Then, the determination unit 120 determines whether or not the difference between the position of the target in the first image and the position of the target in the second image is in the predetermined range (step S103). The result of the determination by the determination unit 120 is outputted to the control unit 130.

When the difference between the position of the target in the first image and the position of the target in the second image is not in the predetermined range (the step S103: NO), the processing is restarted from the step S101. On the other hand, when the difference between the position of the target in the first image and the position of the target in the second image is in the predetermined range (the step S103: YES), the control unit 130 performs the control of capturing the iris image of the target (step S104).

Technical Effect

Next, a technical effect obtained by the information processing system 10 according to the twelfth example embodiment will be described.

As described in FIG. 21, in the information processing system 10 according to the twelfth example embodiment, in a case where the first image and the second image include a plurality of targets, the trigger determination is performed on one target selected from the plurality of targets. In this way, even if there are a plurality of targets, it is possible to capture the iris image of the target at appropriate timing.

Thirteenth Example Embodiment

The information processing system 10 according to a thirteenth example embodiment will be described with reference to FIG. 22. The thirteenth example embodiment is partially different from the first to twelfth example embodiments only in the operation, and may be the same as the first to twelfth example embodiments in the other parts. For this reason, a part that is different from each of the example embodiments described above will be described in detail below, and a description of the other overlapping parts will be omitted as appropriate.

(Flow of Operation)

First, with reference to FIG. 22, a flow of operation by the information processing system 10 according to the thirteenth example embodiment will be described. FIG. 22 is a flowchart illustrating the flow of the operation of the information processing system according to the thirteenth example embodiment. In FIG. 22, the same steps as those illustrated in FIG. 5 carry the same reference numerals.

Figure 22:
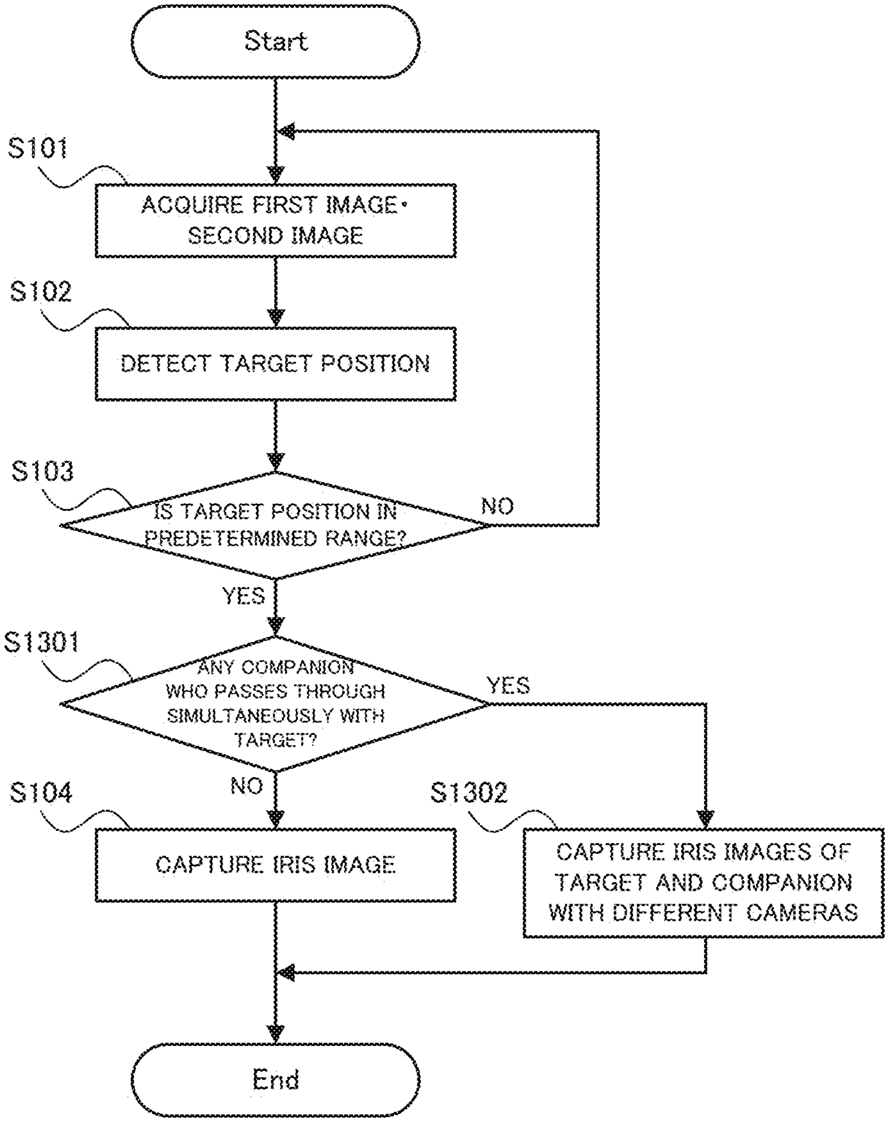
FIG. 22 is a flowchart illustrating a flow of operation of an the information processing system according to a thirteenth example embodiment.

As illustrated in FIG. 22, when the operation of the information processing system 10 according to the thirteenth example embodiment is started, first, the acquisition unit 110 acquires the first image and the second image (step S101). The first image and the second image acquired in the acquisition unit 110 are outputted to the determination unit 120.

Subsequently, the determination unit 120 detects the position of the target from each of the first image and the second image acquired by the acquisition unit 110 (step S102). Then, the determination unit 120 determines whether or not the difference between the position of the target in the first image and the position of the target in the second image is in the predetermined range (step S103). When the difference between the position of the target in the first image and the position of the target in the second image is not in the predetermined range (the step S103: NO), the processing is restarted from the step S101.

On the other hand, when the difference between the position of the target in the first image and the position of the target in the second image is in the predetermined range (the step S103: YES), the determination unit 120 further determines whether or not there is a companion who passes through simultaneously with the target (step S1301). An example of the companion includes a person walking alongside the target, a baby held by the target, or the like. The determination unit 120 may use the first image and the second image to determine the presence of the companion, or may use another image to determine the presence of the companion.

When the target does not have a companion (the step S1301: NO), the control unit 130 performs the control of capturing the iris image of the target (step S104). On the other hand, when the target has the companion (the step S1301: YES), the control unit 130 controls different cameras to capture the iris image of the target and an iris image of the companion in parallel (step S1302). Note that, even when there are a plurality of companions, it is possible to capture the iris images in parallel by the number of the cameras. In a case where the number of the cameras is insufficient, only a selected companion may be imaged as in the twelfth example embodiment (see FIG. 21).

Technical Effect

Next, a technical effect obtained by the information processing system 10 according to the thirteenth example embodiment will be described.

As described in FIG. 22, in the information processing system 10 according to the thirteenth example embodiment, in a case where the first image and the second image include a plurality of targets (especially in a case where a plurality of target persons simultaneously add the focus positions), the respective iris images of the targets are captured by different cameras. In this way, even if there are a plurality of targets, it is possible to capture the iris images of the targets at appropriate timing.

Fourteenth Example Embodiment

The information processing system 10 according to a fourteenth example embodiment will be described with reference to FIG. 23 and FIG. 24. The fourteenth example embodiment is partially different from the first to thirteenth example embodiments only in the operation, and may be the same as the first to thirteenth example embodiments in the other parts. For this reason, a part that is different from each of the example embodiments described above will be described in detail below, and a description of the other overlapping parts will be omitted as appropriate.

(Flow of Operation)

First, with reference to FIG. 23, a flow of operation by the information processing system 10 according to the fourteenth example embodiment will be described. FIG. 23 is a flowchart illustrating the flow of the operation of the information processing system according to the fourteenth example embodiment. In FIG. 23, the same steps as those illustrated in FIG. 5 carry the same reference numerals.

Figure 23:
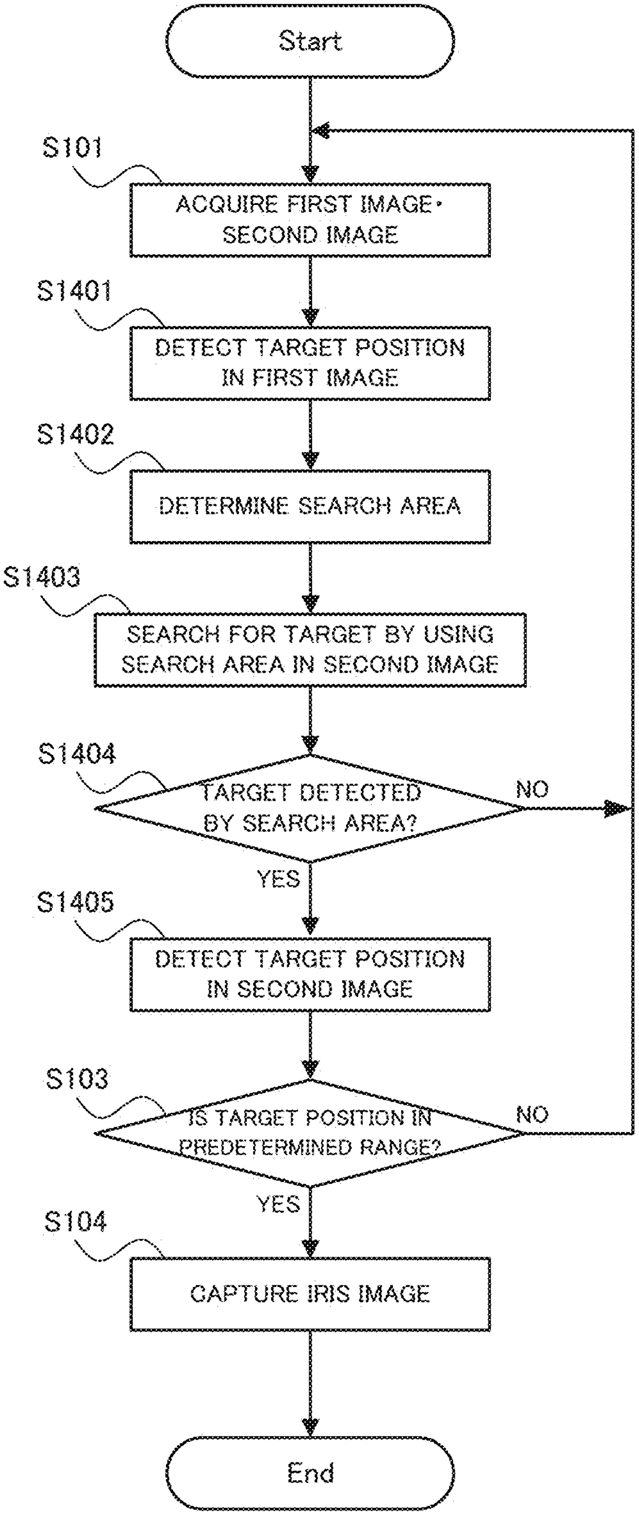
FIG. 23 is a flowchart illustrating a flow of operation of an information processing system according to a fourteenth example embodiment.

As illustrated in FIG. 23, when the operation of the information processing system 10 according to the fourteenth example embodiment is started, first, the acquisition unit 110 acquires the first image and the second image (step S101). The first image and the second image acquired in the acquisition unit 110 are outputted to the determination unit 120.

Subsequently, the determination unit 120 detects the position of the target in the first image (step S1401). Then, the determination unit 120 determines a search area in the second image, from the position of the target in the first image (step S1402). The search area is determined on the second image as an area for searching for the presence of the target. A method of determining the search area will be specifically described later.

Subsequently, the determination unit 120 searches for the target by using the search area in the second image (step S1403). When the presence of the target can be detected by the search area (step S1404), the determination unit 120 detects the position of the target detected by the search area, as the position of the target in the second image (step S1405). When the presence of the target cannot be detected by the search area, the processing may be restarted from the step S101.

When the position of the target is detected in the first image and the second image, the determination unit 120 determines whether or not the difference between the position of the target in the first image and the position of the target in the second image is in the predetermined range (step S103). The result of the determination by the determination unit 120 is outputted to the control unit 130.

When the difference between the position of the target in the first image and the position of the target in the second image is not in the predetermined range (the step S103: NO), the processing is restarted from the step S101. On the other hand, when the difference between the position of the target in the first image and the position of the target in the second image is in the predetermined range (the step S103: YES), the control unit 130 performs the control of capturing the iris image of the target (step S104).

(Search Area)

Figure 24:
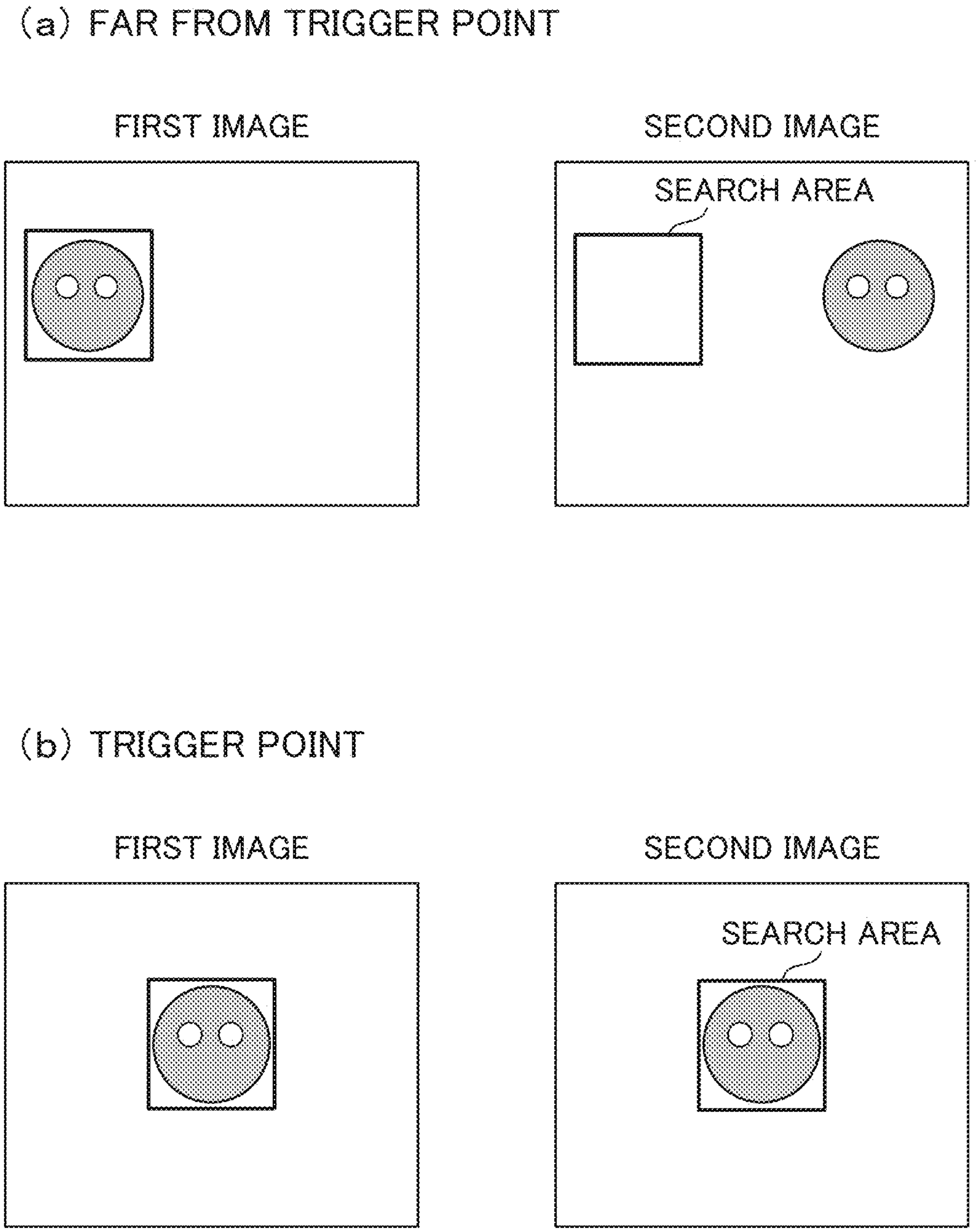
FIG. 24 is a plan view illustrating an example of a first image and a second image acquired by the information processing system according to the fourteenth example embodiment, and a search area.

Next, with reference to FIG. 24, the search area set in the second image will be specifically described. FIG. 24 is a plan view illustrating an example of the first image and the second image acquired by the information processing system according to the fourteenth example embodiment, and the search area.

As illustrated in FIG. 24, in the information processing system 10 according to the fourteenth example embodiment, the search area is determined as an area corresponding to an area in which the target is detected in the first image. For example, in the example illustrated in FIG. 24(*a*), the target is detected near a left end of the first image. In this case, an area near a left edge of the second image is determined as the search area, but the target is not included there, and thus, the target is not detected from the second image. On the other hand, in the example illustrated in FIG. 24(*b*), since the target is detected near the center of the first image, an area near the center of the second image is determined as the search area. Then, since the search area includes the target, the target is detected from the second image.

Technical Effect

Next, a technical effect obtained by the information processing system 10 according to the fourteenth example embodiment will be described.

As described in FIG. 23 and FIG. 24, in the information processing system 10 according to the fourteenth example embodiment, an area in which the target exists in the first image, is set as the search area for the target in the second image. In this way, it is not necessary to search the entire image when detecting the position of the target in the second image. Consequently, it is possible to perform the processing of detecting the position of the target in the second image, at high speed and at low load.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes a processing alone, but also the program that operates on an OS and that executes a processing in cooperation with the functions of expansion boards and another software, is also included in the scope of each of the example embodiments. In addition, the program itself may be stored in a server, and a part or all of the program may be downloaded from the server to a user terminal.

Supplementary Notes

The example embodiments described above may be further described as, but not limited to, the following Supplementary Notes below.

Supplementary Note 1

An information processing system according to Supplementary Note 1 is an information processing system including: an acquisition unit that acquires a first image and a second image that are captured such that optical axes intersect at a predetermined point; a determination unit that determines whether or not a difference between a position of a target in the first image and a position of the target in the second image is in a predetermined range; and a control unit that performs a control of capturing an iris image of the target in a case where the difference is in the predetermined range.

Supplementary Note 2

An information processing system according to Supplementary Note 2 is the information processing system according to Supplementary Note 1, wherein the control unit identifies an eye position of the target from the first image and the second image, and performs the control of capturing the iris image on the basis of the identified eye position.

Supplementary Note 3

An information processing system according to Supplementary Note 3 is the information processing system according to Supplementary Note 1 or 2, wherein the position of the target in the first image and the position of the target the second image are a position of a right eye and a position of a left eye of the target.

Supplementary Note 4

An information processing system according to Supplementary Note 4 is the information processing system according to any one of Supplementary Notes 1 to 3, wherein the predetermined point is set at a rear side of a focus position when viewed from a camera that captures the iris image, and the control unit performs a control of continuously capturing iris images of the target who approaches the camera that captures the iris image, after the difference becomes in the predetermined range.

Supplementary Note 5

An information processing system according to Supplementary Note 5 is the information processing system according to Supplementary Note 4, further including: a selection unit that selects at least one high-quality iris image from the continuously captured iris images; and an authentication unit that performs iris authentication by using the selected iris image.

Supplementary Note 6

An information processing system according to Supplementary Note 6 is the information processing system according to any one of Supplementary Notes 1 to 5, wherein the acquisition unit acquires the first image captured by a first camera and the second image captured by a second camera that is disposed at a different angle from that of the first camera, and the control unit performs a control of imaging the iris image by using a third camera that is different from the first camera and the second camera.

Supplementary Note 7

An information processing system according to Supplementary Note 7 is the information processing system according to Supplementary Note 6, wherein the third camera is disposed in front of the target, and the first camera and the second camera are respectively arranged on a left and a right of the third camera.

Supplementary Note 8

An information processing system according to Supplementary Note 8 is the information processing system according to Supplementary Note 6, wherein each of the first camera, the second camera, and the third camera is disposed at a position where the target is imaged diagonally at an angle deviated from a front of the target.

Supplementary Note 9

An information processing system according to Supplementary Note 9 is the information processing system according to any one of Supplementary Notes 1 to 5, wherein the acquisition unit acquires the first image captured by a fourth camera through a first surface of a mirror, and the second image captured by the fourth camera through a second surface of the mirror.

Supplementary Note 10

An information processing system according to Supplementary Note 10 is the information processing system according to any one of Supplementary Notes 1 to 5, wherein the acquisition unit acquires the first image captured directly by a fifth camera, and the second image captured by the fifth camera through a mirror.

Supplementary Note 11

An information processing system according to Supplementary Note 11 is the information processing system according to any one of Supplementary Notes 1 to 10, further including an identification unit that identifies the target, wherein the determination unit determines whether or not a difference between a position of the identified target in the first image and a position of the identified target in the second image is in the predetermined range.

Supplementary Note 12

An information processing system according to Supplementary Note 12 is the information processing system according to any one of Supplementary Notes 1 to 11, wherein the control unit selects one of a plurality of targets in a case where the first image and the second image include the plurality of targets, and performs a control of capturing the iris image of the selected target.

Supplementary Note 13

An information processing system according to Supplementary Note 13 is the information processing system according to any one of Supplementary Notes 1 to 11, wherein the control unit performs a control of capturing the iris images of a plurality of targets by using different cameras for the plurality of respective targets, in a case where the first image and the second image include the plurality of targets.

Supplementary Note 14

An information processing system according to Supplementary Note 14 is the information processing system according to any one of Supplementary Notes 1 to 13, wherein the determination unit detects a first target that includes the target in the first image, and then searches for whether or not the target is in a second area corresponding to the first area, in the second image.

Supplementary Note 15

An information processing method according to Supplementary Note 15 is an information processing method executed by at least one computer, the information processing method including: acquiring a first image and a second image that are captured such that optical axes intersect at a predetermined point; determining whether or not a difference between a position of a target in the first image and a position of the target in the second image is in a predetermined range; and performing a control of capturing an iris image of the target in a case where the difference is in the predetermined range.

Supplementary Note 16

A recording medium according to Supplementary Note 16 is a recording medium on which a computer program that allows at least one computer to execute an information processing method is recorded, the information processing method including: acquiring a first image and a second image that are captured such that optical axes intersect at a predetermined point; determining whether or not a difference between a position of a target in the first image and a position of the target in the second image is in a predetermined range; and performing a control of capturing an iris image of the target in a case where the difference is in the predetermined range.

Supplementary Note 17

An information processing apparatus according to Supplementary Note 17 is an information processing apparatus including: an acquisition unit that acquires a first image and a second image that are captured such that optical axes intersect at a predetermined point; a determination unit that determines whether or not a difference between a position of a target in the first image and a position of the target in the second image is in a predetermined range; and a control unit that performs a control of capturing an iris image of the target in a case where the difference is in the predetermined range.

Supplementary Note 18

A computer program according to Supplementary Note 18 is a computer program that allows at least one computer to execute an information processing method, the information processing method including: acquiring a first image and a second image that are captured such that optical axes intersect at a predetermined point; determining whether or not a difference between a position of a target in the first image and a position of the target in the second image is in a predetermined range; and performing a control of capturing an iris image of the target in a case where the difference is in the predetermined range.

This disclosure is allowed to be changed, if desired, without departing from the essence or spirit of this disclosure which can be read from the claims and the entire specification. An information processing system, an information processing method, and a recording medium with such changes are also intended to be within the technical scope of this disclosure.

DESCRIPTION OF REFERENCE CODES

10 Information processing system
11 Processor
18 Camera
110 Acquisition unit
120 Determination unit
130 Control unit
140 Selection unit
150 Authentication unit
160 Identification unit
181 First camera
182 Second camera
183 Third camera
184 Fourth camera
185 Fifth camera
200 Mirror
201 First surface
202 Second surface
250 Mirror

What is claimed is:

1. An information processing system comprising:
at least one memory that is configured to store instructions; and
at least one processor that is configured to execute the instructions to
acquire a first image and a second image that are captured such that optical axes intersect at a predetermined point set at a rear side of a focus position when viewed from a camera that captures the iris image;
determine whether or not a difference between a position of a target in the first image and a position of the target in the second image is in a predetermined range;
perform a control of capturing an iris image of the target in a case where the difference is in the predetermined range;
perform a control of continuously capturing iris images of the target who approaches the camera that captures the iris image, after the difference becomes in the predetermined range;
select at least one high-quality iris image from the continuously captured iris images; and
perform iris authentication by using the selected iris image.

2. The information processing system according to claim 1, wherein the at least one processor is configured to execute the instructions to identify an eye position of the target from the first image and the second image, and perform the control of capturing the iris image on the basis of the identified eye position.

3. The information processing system according to claim 1, wherein the position of the target in the first image and the position of the target the second image are a position of a right eye and a position of a left eye of the target.

4. The information processing system according to claim 1, wherein
the at least one processor is configured to execute the instructions to:
acquire the first image captured by a first camera and the second image captured by a second camera that is disposed at a different angle from that of the first camera, and
perform a control of imaging the iris image by using a third camera that is different from the first camera and the second camera.

5. The information processing system according to claim 4, wherein
the third camera is disposed in front of the target, and
the first camera and the second camera are respectively arranged on a left and a right of the third camera.

6. The information processing system according to claim 4, wherein each of the first camera, the second camera, and the third camera is disposed at a position where the target is imaged diagonally at an angle deviated from a front of the target.

7. The information processing system according to claim 1, wherein the at least one processor is configured to execute the instructions to acquire the first image captured by a fourth camera through a first surface of a mirror, and the second image captured by the fourth camera through a second surface of the mirror.

8. The information processing system according to claim 1, wherein the at least one processor is configured to execute the instructions to acquire the first image captured directly by a fifth camera, and the second image captured by the fifth camera through a mirror.

9. The information processing system according to claim 1, wherein the at least one processor is configured to execute the instructions to:

identify the target, and determine whether or not a difference between a position of the identified target in the first image and a position of the identified target in the second image is in the predetermined range.

10. The information processing system according to claim 1, wherein the at least one processor is configured to execute the instructions to select one of a plurality of targets in a case where the first image and the second image include the plurality of targets, and perform a control of capturing the iris image of the selected target.

11. The information processing system according to claim 1, wherein the at least one processor is configured to execute the instructions to perform a control of capturing the iris images of a plurality of targets by using different cameras for the plurality of respective targets, in a case where the first image and the second image include the plurality of targets.

12. The information processing system according to claim 1, wherein the at least one processor is configured to execute the instructions to detect a first target that includes the target in the first image, and then search for the target in a second area corresponding to the first area, in the second image.

13. An information processing method executed by at least one computer, the information processing method comprising:

acquiring a first image and a second image that are captured such that optical axes intersect at a predetermined point set at a rear side of a focus position when viewed from a camera that captures the iris image;

determining whether or not a difference between a position of a target in the first image and a position of the target in the second image is in a predetermined range; and performing a control of capturing an iris image of the target in a case where the difference is in the predetermined range;

performing a control of continuously capturing iris images of the target who approaches the camera that captures the iris image, after the difference becomes in the predetermined range;

selecting at least one high-quality iris image from the continuously captured iris images; and perform iris authentication by using the selected iris image.

14. A non-transitory recording medium on which a computer program that allows at least one computer to execute an information processing method is recorded, the information processing method including:

acquiring a first image and a second image that are captured such that optical axes intersect at a predetermined point set at a rear side of a focus position when viewed from a camera that captures the iris image;

determining whether or not a difference between a position of a target in the first image and a position of the target in the second image is in a predetermined range; and performing a control of capturing an iris image of the target in a case where the difference is in the predetermined range;

performing a control of continuously capturing iris images of the target who approaches the camera that captures the iris image, after the difference becomes in the predetermined range;

selecting at least one high-quality iris image from the continuously captured iris images; and perform iris authentication by using the selected iris image.

* * * * *